(12) United States Patent
Ahn et al.

(10) Patent No.: US 12,171,360 B2
(45) Date of Patent: Dec. 24, 2024

(54) ELECTRIC KETTLE

(71) Applicant: LG ELECTRONICS INC., Seoul (KR)

(72) Inventors: Jaehoon Ahn, Seoul (KR); Hoyong Jang, Seoul (KR); Seungje Park, Seoul (KR); Donghyun Kim, Seoul (KR); Sangki Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 790 days.

(21) Appl. No.: 17/425,174

(22) PCT Filed: Jan. 23, 2020

(86) PCT No.: PCT/KR2020/001235
§ 371 (c)(1),
(2) Date: Jul. 22, 2021

(87) PCT Pub. No.: WO2020/153825
PCT Pub. Date: Jul. 30, 2020

(65) Prior Publication Data
US 2022/0117434 A1    Apr. 21, 2022

(30) Foreign Application Priority Data

Jan. 25, 2019  (KR) .................. 10-2019-0010119
Mar. 21, 2019  (KR) .................. 10-2019-0032612
(Continued)

(51) Int. Cl.
*A47J 27/21*     (2006.01)
*A47J 45/07*    (2006.01)

(52) U.S. Cl.
CPC ..... *A47J 27/21166* (2013.01); *A47J 27/2105* (2013.01); *A47J 45/07* (2013.01)

(58) Field of Classification Search
None
See application file for complete search history.

(56) References Cited

U.S. PATENT DOCUMENTS 3,487,200 A    12/1969  Waller et al.
3,609,298 A    9/1971   Adamson et al.
(Continued)

FOREIGN PATENT DOCUMENTS

CN    204813395 A    12/2015
CN    105640320 A    6/2016
(Continued)

*Primary Examiner* — Elizabeth M Kerr
*Assistant Examiner* — Fahmida Ferdousi
(74) *Attorney, Agent, or Firm* — Bryan Cave Leighton Paisner LLP

(57) ABSTRACT

An electric kettle having a handle coupled to one end of a body is proposed. The electric kettle includes: a body receiving water or food therein; a lid configured to shield an open upper side of the body; a base provided at a lower side of the body and configured to support the body; a spout provided on an upper end of the body and guiding a discharge of the water or food contained inside the body; and a handle fastened to the upper end of the body and configured to be held by hand. According to the configuration of the electric kettle, there are advantages of providing a compact and aesthetic appearance and improving assemblability.

7 Claims, 26 Drawing Sheets

(30) Foreign Application Priority Data

Mar. 21, 2019 (KR) ........................ 10-2019-0032616
Jan. 22, 2020 (KR) ........................ 10-2020-0008931

(56) References Cited

U.S. PATENT DOCUMENTS

| | | | |
|---|---|---|---|
| 3,681,568 A | 8/1972 | Schaefer | |
| 4,517,445 A | 5/1985 | Tatsumi et al. | |
| 6,840,802 B2 | 1/2005 | Shepherd | |
| 11,534,016 B2* | 12/2022 | Ahn | A47J 27/21175 |
| 11,944,228 B2* | 4/2024 | Ahn | A47J 27/21058 |
| 11,944,229 B2* | 4/2024 | Ahn | A47J 27/21091 |
| 2003/0095029 A1* | 5/2003 | Shepherd | A47J 27/21108 |
| | | | 337/333 |
| 2007/0278202 A1* | 12/2007 | Long | A47J 31/20 |
| | | | 219/442 |
| 2008/0023463 A1* | 1/2008 | Labelle | A47J 27/21191 |
| | | | 219/438 |
| 2008/0169281 A1 | 7/2008 | Borovicka et al. | |
| 2009/0020018 A1* | 1/2009 | Melzer | A47J 31/20 |
| | | | 99/288 |
| 2009/0151891 A1 | 6/2009 | Li et al. | |
| 2010/0270284 A1* | 10/2010 | Cohen | A47J 27/21175 |
| | | | 219/507 |
| 2011/0033176 A1* | 2/2011 | Garvey | A47J 27/21166 |
| | | | 392/444 |
| 2012/0180903 A1* | 7/2012 | Stein | A47J 27/21191 |
| | | | 141/82 |
| 2014/0178548 A1* | 6/2014 | Drummond | A47J 27/21166 |
| | | | 220/573.1 |
| 2014/0246428 A1* | 9/2014 | Bodum | A47J 41/0055 |
| | | | 220/62.11 |
| 2016/0178276 A1 | 6/2016 | Park | |
| 2018/0310748 A1 | 11/2018 | Haroni | |
| 2020/0187702 A1* | 6/2020 | Kim | A47J 27/2105 |
| 2020/0297144 A1* | 9/2020 | Ahn | A47J 27/2105 |
| 2020/0297146 A1* | 9/2020 | Ahn | A47J 27/21058 |
| 2020/0297147 A1* | 9/2020 | Ahn | A47J 27/2105 |
| 2020/0297148 A1* | 9/2020 | Park | H05B 1/0269 |
| 2020/0297149 A1* | 9/2020 | Park | A47J 27/212 |
| 2020/0297150 A1* | 9/2020 | Si | A47J 27/2105 |
| 2021/0204746 A1* | 7/2021 | Katsunuma | A47J 27/21025 |
| 2021/0337999 A1* | 11/2021 | Mander | A47J 27/2105 |
| 2022/0104649 A1* | 4/2022 | Ahn | A47J 45/067 |
| 2022/0117434 A1* | 4/2022 | Ahn | A47J 45/07 |
| 2022/0175172 A1* | 6/2022 | Fryer | A47J 27/21016 |
| 2022/0240709 A1* | 8/2022 | Lee | A47J 27/21008 |
| 2022/0369422 A1* | 11/2022 | Yoon | A47J 27/21058 |

FOREIGN PATENT DOCUMENTS

| | | | | |
|---|---|---|---|---|
| CN | 205338636 U | 6/2016 | | |
| CN | 206026037 A | 3/2017 | | |
| CN | 206239137 U | 6/2017 | | |
| DE | 202010004253 U1 * | 7/2010 | | A47J 27/21158 |
| EP | 1500363 A1 * | 1/2005 | | A47J 27/21075 |
| GB | 2496696 A | 5/2013 | | |
| JP | 2009291418 A | 12/2009 | | |
| JP | 2012-147830 A | 1/2011 | | |
| JP | 2012-101004 A | 5/2012 | | |
| JP | 2012-152602 A | 8/2012 | | |
| JP | 2012-239823 A | 12/2012 | | |
| KR | 1020080009962 A | 1/2008 | | |
| KR | 1020080086113 A | 9/2008 | | |
| KR | 1020150118178 A | 10/2015 | | |
| KR | 1020160076391 A | 6/2016 | | |
| KR | 1020160076391 A1 | 9/2016 | | |
| KR | 1019139490000 B1 | 10/2018 | | |
| WO | 2010139490 A1 | 12/2010 | | |

* cited by examiner

ELECTRIC KETTLE

CROSS-REFERENCE TO RELATED APPLICATION

This application is the National Stage filing under 35 U.S.C. 371 of International Application No. PCT/KR2020/001235, filed Jan. 23, 2019, which claims priority to and the benefit of Korean Patent Application No. 10-2020-0008931, filed on Jan. 22, 2020, Korean Patent Application No. 10-2019-0032616, filed on Mar. 21, 2019, Korean Patent Application No. 10-2019-0032612, filed on Mar. 21, 2019, and Korean Patent Application No. 10-2019-0010119, filed on Jan. 25, 2019, the disclosure of which is incorporated herein by reference in its entirety.

TECHNICAL FIELD

The present disclosure relates generally to an electric kettle. More particularly, the present disclosure relates to an electric kettle which has a handle coupled to an end of a body thereof.

BACKGROUND ART

Generally, an electric kettle refers to a device that heats water contained in a body by a heating means such as a heater through the supply of electricity.

In addition, such an electric kettle is configured such that the body is detachable from a base to which power is supplied and is heated while seated on the base. The electric kettle can be used by holding a handle and lifting the body away from the base. This type of an electric kettle has various names such as a wireless electric kettle, a wireless electric pot, or a coffee pot, etc.

The body of such an electric kettle may be complicated and there are cases in which the body is formed of a plastic material in order to facilitate the arrangement of the internal configuration of the electric kettle.

However, when the electric kettle is used for a long time, the harmful plastic components or microplastic components of the electric kettle may be dissolved in high-temperature water, and further, the inside of the electric kettle may be contaminated due to the vulnerability to scratches.

Additionally, when the electric kettle has the body made of glass, the electric kettle is hygienic and has a very good appearance but may be damaged due to impact. Furthermore, the electric kettle is inconvenient to be used due to heavy weight and is not easy to be molded.

Accordingly, in Korean Utility Model Registration No. 20-0406420, a multi-function wireless electric pot is disclosed in which the body is made of stainless steel, and water contained inside the body can be heated. In this structure, the body is made of a stainless material, so the wireless electric pot is very hygienic and has excellent durability.

In addition, the upper and lower ends of the handle are connected to the body, and particularly, the lower end is configured to be connected to a heating part provided with a heater, and water can be heated by an on/off switch provided at the handle.

However, in such a structure, the on/off switch for turning the heater on or off is provided in the handle, and a component configured to control the output of power is provided in the heating part instead of the handle, so there is inconvenience in using the wireless electric pot.

Additionally, in order to connect the heating part provided under the body with the on/off switch located at the handle, the handle is required to be connected to the upper and lower portions of the body and thus has a restricted structure, and further, the use of the handle may be inconvenient.

Furthermore, both a heating wire and a control part are configured to be located inside the heating part disposed under the body. Accordingly, the body increases in volume, or decreases in water-receiving space.

In Korean Patent Application Publication No. 10-2017-0074313, "ELECTRIC KETTLE USED FOR BLENDER AND STEAMER" is disclosed. Even in such a prior art, a first control switch configured to turn power on or off by turning a dial or to control the rotation speed and rotation time of a drive clutch is provided in the base, and a second control switch configured to adjust heating temperature and heating time is provided at the handle.

Accordingly, in order to control an electric pot, it is necessary to separately drive switches provided at different positions, so the control of the electric pot is cumbersome. In addition, an electronic part such as a PCB for controlling power on/off is provided in the base close to the heater, so the electronic part may be damaged due to heat of the heater.

Meanwhile, in U.S. Pat. No. 9,226,610 B2, a push-button and a state display part are provided at the handle, but the state display part is provided at a portion of the handle held by a hand, so it is difficult to check a state of an electric kettle from above. Furthermore, the upper and lower ends of the handle are fixed integrally to the body, which increases manufacturing and assembly difficulty.

In addition, in European Patent No. EP 2805650 B1, a controller is illustrated to be installed at an upper end part of the handle.

However, even in such a prior art, the upper and lower ends of the handle are coupled to the body. Accordingly, the body and the handle are required to be formed to be integrated with each other or each of the upper and lower ends of the handle is required to be fastened to the body, which decreases productivity.

Furthermore, multiple parts are fastened inside the handle having a small size by screws, so the assembly of the parts is difficult, which decreases productivity.

DISCLOSURE

Technical Problem

Accordingly, the present disclosure is intended to solve the above problems occurring in the prior art, and the present disclosure is intended to propose an electric kettle which is improved in simplified assembly and productivity.

The present disclosure is intended to propose an electric kettle in which a handle can be easily mounted to a surface of a body.

The present disclosure is intended to propose an electric kettle in which a control part is spaced far apart from a heater such that the control malfunction of the control part due to heat of the heater is prevented.

The present disclosure is intended to propose an electric kettle in which the assembly of the handle composed of a handle support and a handle cover is easily performed.

The present disclosure is intended to propose an electric kettle in which components located in the handle are supported by the handle support and the handle cover such that the simplified assembly and productivity of the electric kettle are improved.

The present disclosure is intended to propose an electric kettle in which the control part located in the handle is securely supported up and down, forward and downward, and side to side.

Technical Solution

In order to accomplish the above objectives, in an electric kettle of the present disclosure according to an aspect of the present disclosure, an end of the handle may be configured to be fastened to an upper end of the body. Accordingly, the electric kettle may have a compact structure and may be easy to be manufactured and assembled.

Additionally, in the electric kettle of the present disclosure, the body may be configured to have a double structure, and the handle may be provided on the outer side of the body having a double structure. Accordingly, the temperature of the inside of the body may not be transmitted to the handle.

In the electric kettle of the present disclosure, a handle bracket may be coupled to an inner body by welding, and the handle may be fastened to the handle bracket by a screw. Accordingly, damage to the body may be prevented and the fastening of the handle may be easily performed.

In the electric kettle of the present disclosure, a handle cover constituting the exterior of the handle and the handle support may be fastened to each other by a one-touch action. That is, the handle cover may be brought close to the handle support to be fitted thereover such that the handle cover is fastened to the handle support.

In the electric kettle of the present disclosure, a holding end held in an outer body may be formed at the front end of the handle. Accordingly, the handle may be securely held in the body, so the assembly of the handle may be easy.

In the electric kettle of the present disclosure, a holding rib may be formed at a touch booster constituting the handle.

In the electric kettle of the present disclosure, a seating rib supporting a PCB (printed circuit board) may be provided at a side frame. Accordingly, even without a separate fastening means, the PCB may be easily mounted to the side frame.

The electric kettle of the present disclosure may include the body receiving water or food therein; a lid configured to shield the open upper side of the body; a base provided at the lower side of the body and configured to support the body; a spout provided at the upper end of the body and guiding the discharge of the water or food contained inside the body; the handle fastened to the upper end of the body and configured to be held by a hand.

The body may be configured as a double structure such that the body includes the inner body constituting the appearance of the inside of the body and the outer body constituting the appearance of the outside of the body, and the handle may be coupled to the upper end of the inner body.

The handle bracket may be provided at the inner body, and the handle may be fastened to the handle bracket.

The handle bracket may be fixed to the outer surface of the inner body by welding or an adhesive.

The handle may be fastened to the handle bracket by the fastening means.

The handle may include the handle support supporting multiple parts provided therein and constituting the frame of the handle, and the handle cover coupled to the handle support and covering the multiple parts provided in the handle support, wherein the handle cover may be fastened to the handle support by a one-touch action.

The handle cover may be fastened to the handle support by a hook coupling.

At least one hook and a cover bracket coupled integrally to the handle cover may be provided at the inner surface of the handle cover.

The cover bracket may be in close contact with and fixed to the inner surface of the handle cover by welding or an adhesive.

Hook grooves and hooks may be formed at the handle support and the cover bracket, respectively, such that the hook grooves and the hooks have shapes corresponding to each other to be fastened to each other.

The handle support may include a side wall frame covering parts received therein, and a pillar frame formed by bending downward and extending from an end of the side wall frame. The cover bracket may include a side part configured to have a shape corresponding to a shape of the outer surface of the side wall frame, and a pillar part configured to have a shape corresponding to a shape of the outer surface of the pillar frame.

At least one hook and at least one hook groove may be formed at positions corresponding to the side part and the side wall frame, respectively, and at positions corresponding to the pillar part and the pillar frame, respectively.

The hook may include the side wall hook formed at the side part of the cover bracket, and the pillar hook formed at the pillar part of the cover bracket, wherein the side wall hook and the pillar hook may be formed by being cut and bent from the cover bracket.

The pillar hook may include a receiving part cut from the pillar part and formed at a position spaced apart from the pillar part; a support part bending from a first end of the receiving part and connecting the receiving part and the pillar part to each other; and a guide part formed by bending and extending from a second end of the receiving part.

The handle support may be provided with a bracket fastening end to which the handle bracket is fastened.

The handle bracket may include an attaching part coupled to the inner body; a fastening part coupled to the bracket fastening end; and a connecting part connecting the attaching part and the fastening part to each other, the attaching part and the fastening part being spaced part from each other.

The attaching part may be configured to have a curvature corresponding to the outer surface of the inner body and may be fixed to the inner body by welding or an adhesive.

The holding end held in the outer body may be formed at an end of the handle support by protruding outward therefrom.

The holding end may be formed by protruding upward or downward from the front end of the handle support.

At least one reinforcing rib may be formed at a side of the bracket fastening end so as to reinforce the rigidity of the bracket fastening end.

The holding end may be located inside the outer body, and a surface of the holding end may be configured to have a curvature corresponding to the curvature of the inner surface of the outer body.

At least one seating rib supporting a PCB may be provided at the inner side of the side wall frame.

Advantageous Effects

The electric kettle of the present disclosure has the following effects.

First, in the electric kettle of the present disclosure, the upper end part of a handle is fastened to the upper end of the body. Accordingly, the electric kettle has a compact structure as a whole and is easy to be manufactured and assembled.

Second, in the electric kettle of the present disclosure, a handle bracket is coupled to an inner body by welding, and the handle is fastened to the handle bracket by a screw. Accordingly, damage to the body is prevented and the fastening of the handle is easily performed, thereby making the appearance of the electric kettle beautiful and manufacturing thereof easy.

Third, in the electric kettle of the present disclosure, a handle cover constituting the exterior of the handle and a handle support are configured to be fastened to each other by a one-touch action. Accordingly, the assembly of the handle is simple and thus productivity of the electric kettle is improved.

Fourth, in the electric kettle of the present disclosure, a holding end held in an outer body is formed at the front end of the handle. Accordingly, the front end of the handle is coupled to the inner body and is held in and supported by the outer body due to the holding end, thereby realizing the secured holding of the handle and preventing damage to the handle even in the case in which weight of contents contained in the body is heavy.

Fifth, in the electric kettle of the present disclosure, the holding end held in the outer body is configured to protrude downward or upward from the front end of the handle. Accordingly, first, the holding end is inserted to and held in a cut portion (a handle hole) of the outer body and then is fastened to the handle bracket by a screw, whereby the handle is easily fastened to a precise position of a side surface of the body, thereby preventing defects of the electric kettle and increasing productivity thereof.

Sixth, in the electric kettle of the present disclosure, the bracket fastening end is provided in the handle and is screwed to the handle bracket fastened to the inner body. In addition, a reinforcing rib is provided at such a bracket fastening end to reinforce the rigidity of the bracket fastening end. Accordingly, the bending of the handle is prevented and the rigidity of the handle is increased.

Seventh, in the electric kettle of the present disclosure, the holding rib is provided at the touch booster constituting the handle. That is, the holding rib is formed at the touch booster by protruding laterally therefrom and is seated in a holding-rib groove of the side wall frame. Accordingly, even without a separate fastening part such as a screw, the touch booster is seated at a precise position and thus the assembly thereof is easy.

Eighth, in the electric kettle of the present disclosure, a seating rib supporting a PCB is provided at the side frame. Accordingly, a main PCB can be seated only by being placed down on the side frame from an upper side thereof, thereby facilitating the mounting of the PCB even without a separate fastening means and preventing the vertical shaking of the PCB.

Ninth, in the electric kettle of the present disclosure, a booster support end is formed at the rear end of the touch booster by protruding downward therefrom and is received and seated in a support end groove of the handle support. Accordingly, the touch booster is easily mounted to and supported at a precise position of the inside of the handle, thereby improving production efficiency.

Tenth, in the electric kettle of the present disclosure, parts provided in the handle may be configured to have shapes and sizes corresponding to the inner space of the handle. That is, the entire size and shape of the touch booster, a touch PCB, and the main PCB may be configured to have size and shape corresponding to the size and shape of the inside of the side frame of the handle support. Accordingly, these parts are supported by the holding rib, a board support jaw, and the seating rib, or by being in contact with the inner surface of the side frame and the inner surface (a lower surface, etc.) of the handle cover, so the shakings of these parts in all directions can be prevented. That is, the assembly of the handle support with the handle cover and the mounting of multiple parts to the inside of the handle are performed only by fitting or seating, thereby fixedly supporting the parts up and down, forward and rearward, and side to side.

MODE FOR INVENTION

Hereinbelow, an electric kettle of the present disclosure will be described in detail with reference to the accompanying drawings.

Figure 1:
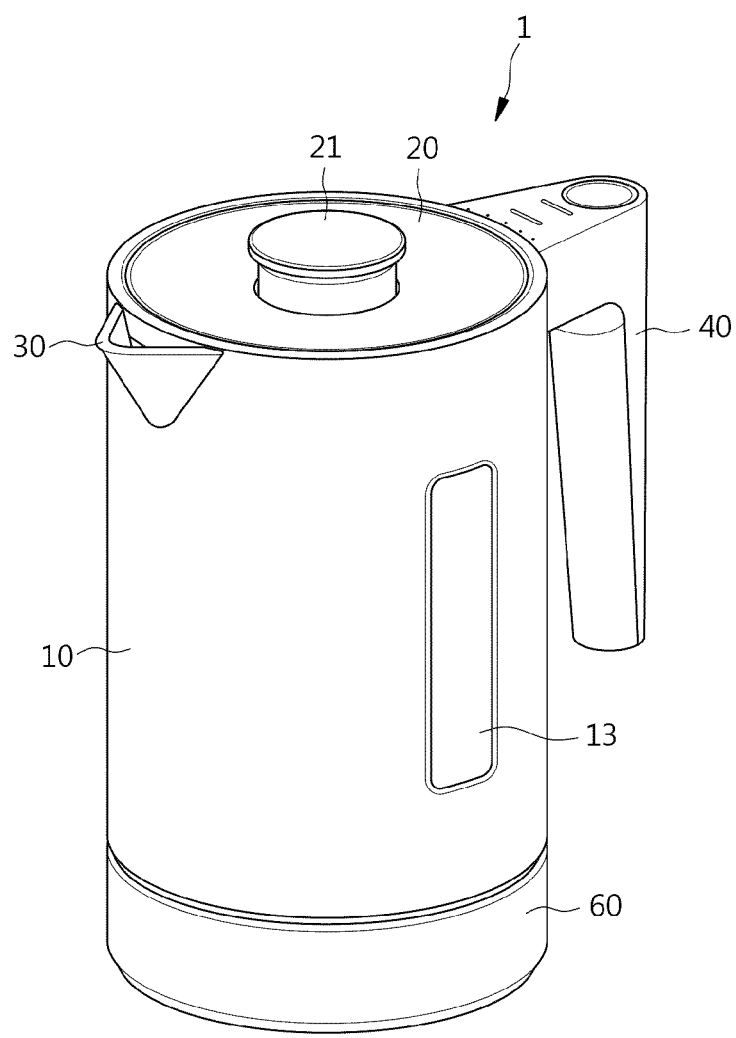
FIG. 1 is a perspective view illustrating the configuration of an electric kettle of the present disclosure according to an exemplary embodiment.
Figure 2:
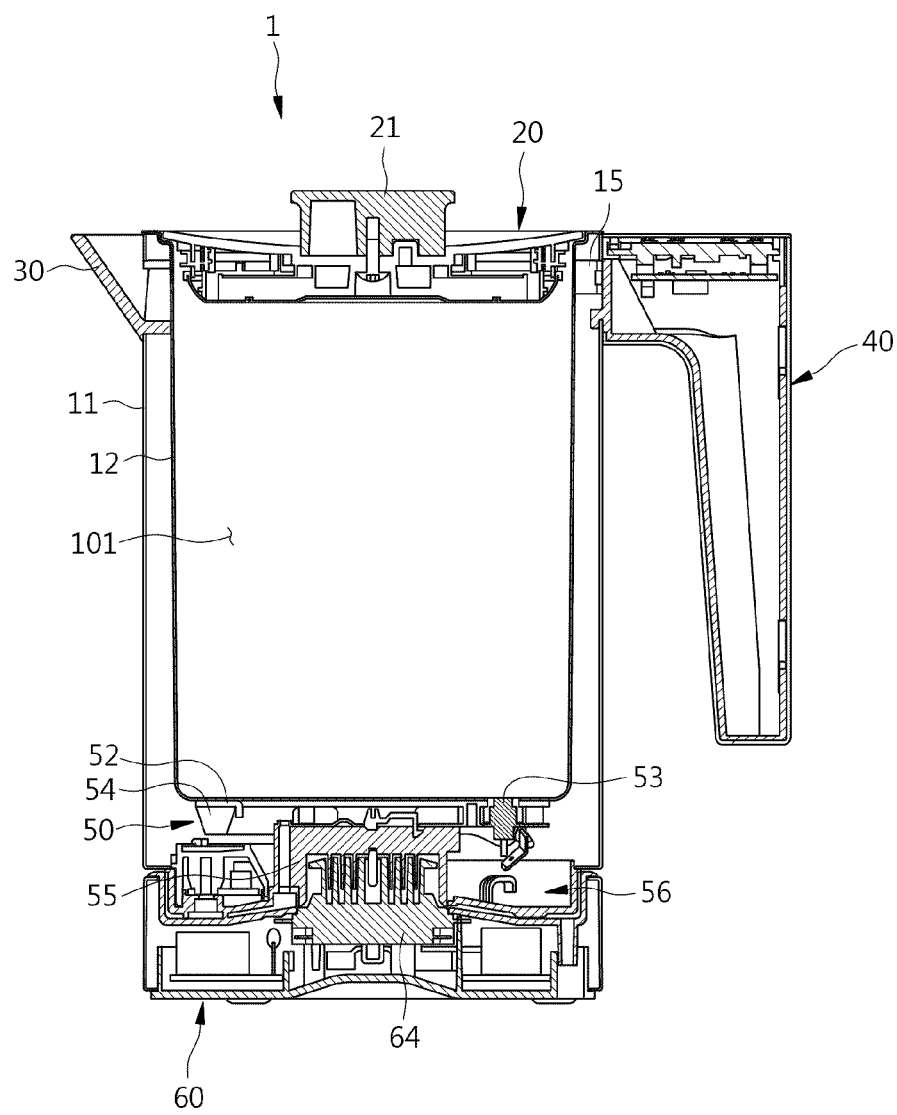
FIG. 2 is a vertical sectional view illustrating the configuration of the inside of the electric kettle of the present disclosure.

In FIGS. 1 to 4, the configuration of the electric kettle of the present disclosure according to a first embodiment is illustrated. That is, a perspective view and a vertical sectional view illustrating the configuration of the electric kettle of the present disclosure according to the embodiment are illustrated in FIGS. 1 and 2, respectively, and the upper side and lower side exploded perspective views of the electric kettle illustrated in FIG. 1 are illustrated in in FIGS. 3 and 4, respectively.

As illustrated in these drawings, the electric kettle 1 according to the embodiment of the present disclosure may include a body 10 receiving water or food therein; a lid 20 configured to shield the open upper side of the body 10; a base 60 provided at a lower side of the body 10 and configured to support the body 10; a spout 30 provided on an upper end of the body 10 and guiding the discharge of the water or food contained inside the body 10; and a handle 40 fastened to the upper end of the body 10 and configured to be held by hand.

Specifically, the electric kettle 1 according to the embodiment of the present disclosure may be configured in a cylindrical shape as a whole and may be composed of the body 10 in which water or food is received; the lid 20 configured to shield the open upper side of the body 10; the handle 40; a heating module 50; and the base 60.

The body 10 may be configured in a cylindrical shape having an open upper surface. Accordingly, the upper surface of the body 10 may be shielded by the lid 20.

The handle 40 may be configured by protruding outward from a side of the body 10. That is, as illustrated in the drawings, the handle 40 may be provided to protrude to the right side of the upper end of the body 10.

The base 60 may be disposed on a surface of a foundation and may be connected to a power cord such that external power can be supplied to the base 60.

In addition, the body 10 in an assembled state may be seated on the upper surface of the base 60.

The body 10 may be configured to have a cylindrical shape and may include a heating space 101 in which water is received and heated. In addition, the body 10 may receive power while the body 10 is seated on the base 60.

The base 60 and the body 10 may receive power through contact between power terminals. Additionally, the supply of power to the base 60 and the body 10 may be performed in an electromagnetic induction method.

To this end, a lower power module 64 functioning as a primary coil may be provided in the base 60, and an upper power module 55 functioning as a secondary coil may be provided in the body 10 corresponding to the base 60.

The heating module 50 and a bottom cover 56 may be installed at the lower end of the body 10. Accordingly, the heating module 50 and the bottom cover 56 may constitute a portion of the lower part of the body 10 and thus may be referred to as "a lower body".

The heating module 50 may include a heating plate 52 constituting a bottom surface of the inside of the body 10 or configured to be in close contact with the bottom surface of the body 10, and a heater 54 configured to heat the heating plate 52, wherein the heating plate 52 may be heated by power supplied from the upper power module 55. In addition, the heating module 50 may include a bottom cover 56 constituting the lower surface of the body 10.

The spout 30 may be formed at an end of the body 10 by protruding outward therefrom such that water contained in the body 10 is poured through the spout.

The handle 40 may be mounted to the outer surface of the body and at a side opposite to the spout 30. That is, as illustrated in FIG. 1, the handle 40 may be formed at the right surface of the body 10, and the spout 30 may be formed at the left surface of the body 10. Accordingly, a user may easily pour water through the spout 30 while holding the handle 40 with a hand.

Meanwhile, the handle 40 may be fastened to an outer surface of a side (the right side in the drawings) of the body 10.

The handle 40 is a part held by a hand such that a user easily lifts or moves the electric kettle 1 and may include a decoration and a grip part made of an elastic material. That is, the handle 40 may have a luxurious exterior and at least a portion thereof (a grip part, etc.) may be made of rubber or silicone such that the hand of a user is prevented from slipping when the user holds the handle 40.

Additionally, the handle 40 may be provided with a button by which a user performs a power on/off manipulation or temperature control. To this end, the handle 40 may include a PCB provided therein and may be configured such that the operation state of the electric kettle 1 is displayed.

The body 10 is preferable configured to have a double structure. That is, the body 10 may be composed of an outer body 11 constituting the appearance of the outside of the body 10 and an inner body 12 constituting the appearance of the inside of the body 10.

The handle 40 may be configured to be coupled to the upper end of the inner body 12. That is, the inner body 12 may be provided with a handle bracket 15 to be described later and may be configured such that the handle 40 is fastened to the handle bracket 15. In addition, the handle bracket 15 may be fixed to the outer surface of the inner body 12 by welding or an adhesive.

The open upper surface of the electric kettle 1, that is, the upper surface of the body 10 may be shielded by the lid 20.

While the lid 20 is closed, the lid 20 may constitute the upper surface of the electric kettle 1 and may be in contact with the circumference of the upper end of the body 10 to seal the inside of the electric kettle 1.

A cap 21 may be formed at the center of the lid 20 by protruding upward therefrom. The cap 21 may function to allow a user to easily raise the lid 20 or to easily couple the lid 20 to the body 10.

In addition, the handle bracket 15 may be configured to be attached to or fixed to the upper end of the inner body 12 such that the handle 40 is coupled to the body 10 by a fastening bolt.

Additionally, a temperature sensor 53 may be provided at the lower surface of the inner body 12 so as to measure the temperature of water contained in the heating space 101.

Figure 5:
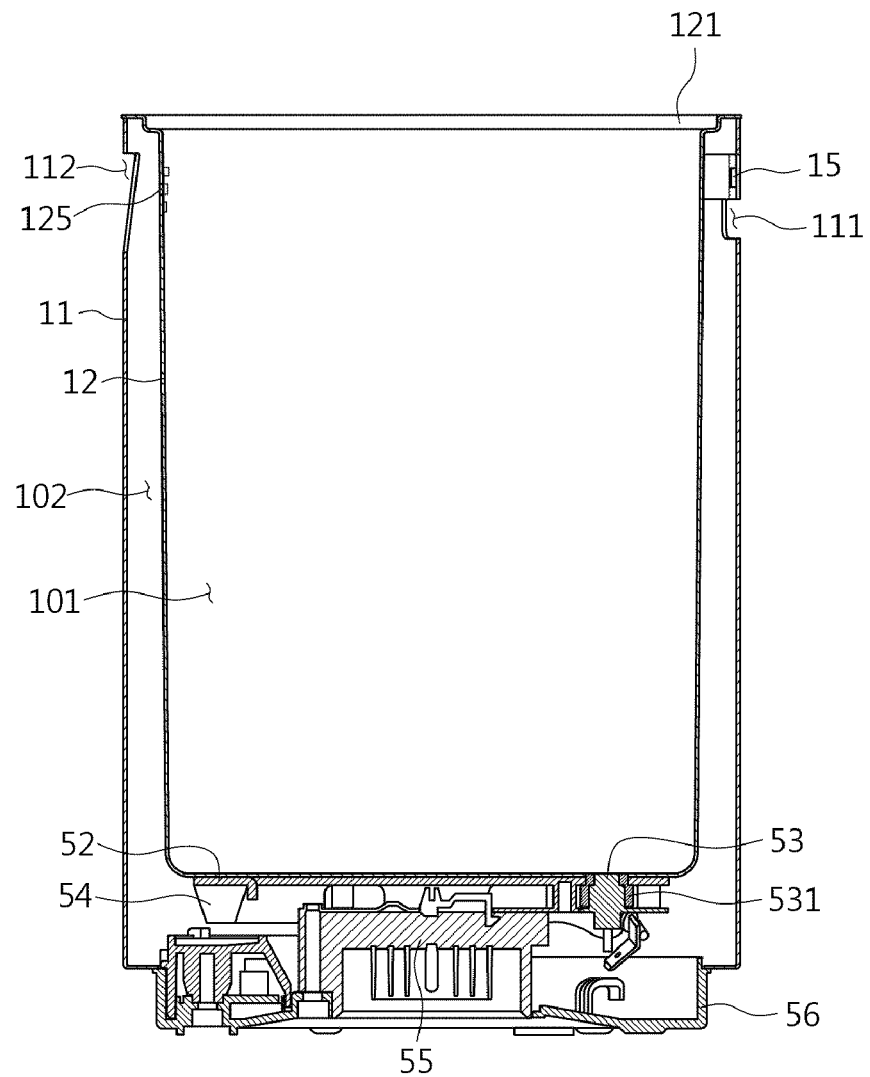
FIG. 5 is a vertical sectional view illustrating the inner configuration of a body constituting the electric kettle of the present disclosure according to the embodiment.
Figure 6:
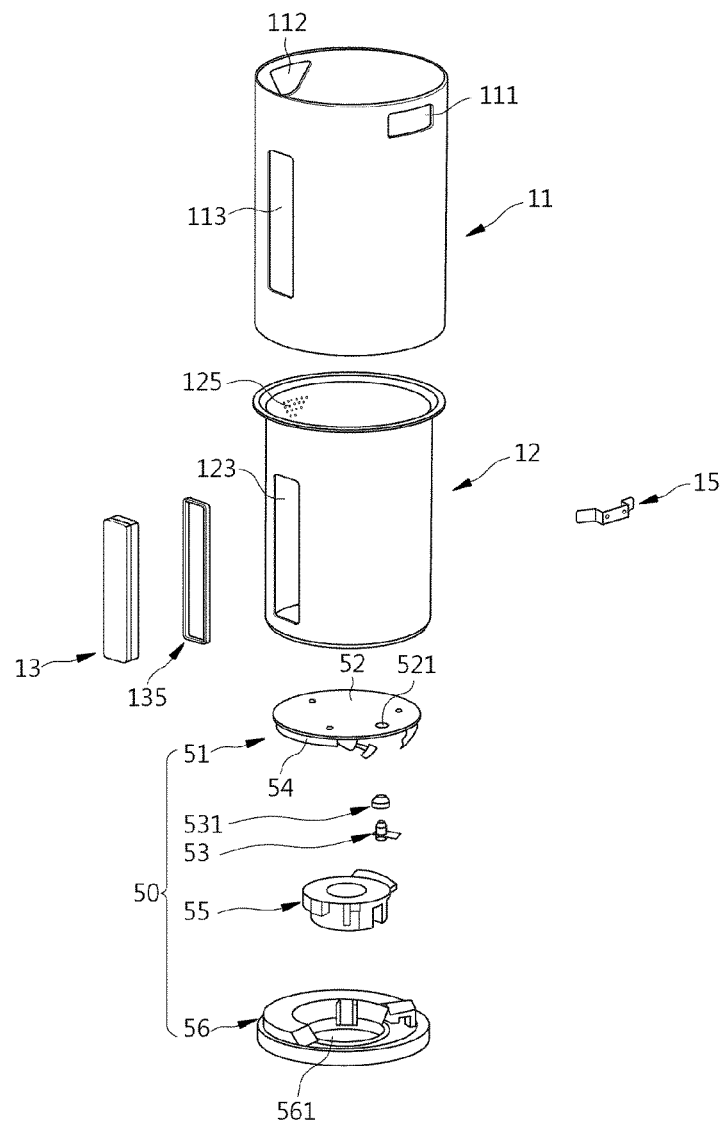
FIG. 6 is an upper side exploded perspective view illustrating the configuration of the body constituting the electric kettle of the present disclosure according to the embodiment.
Figure 7:
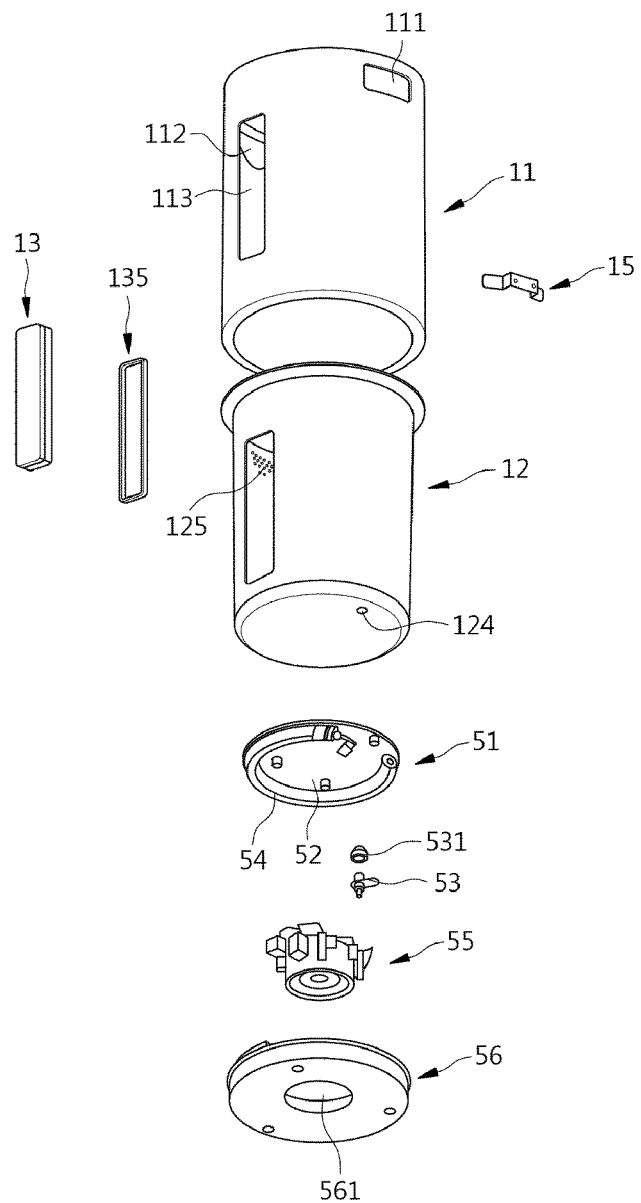
FIG. 7 is a lower side exploded perspective view illustrating the configuration of the body constituting the electric kettle of the present disclosure according to the embodiment.

In FIGS. 5 to 7, the detailed configuration of the body 10 is illustrated. That is, in FIG. 5, the vertical sectional view of the body 10 is illustrated, and the upper side exploded perspective views and lower side exploded perspective views of the body 10 are illustrated in FIGS. 6 and 7, respectively.

As illustrated in these drawings, the body 10 may be configured to have a cylindrical shape having an open top as a whole, and contents such as water may be received in space defined in the body 10, and the heating module 50 may be provided at the lower end parts of the body 10 such that contents contained in the body 10 can be heated.

The body 10 is preferably configured as a double structure. That is, the body 10 may be composed of the inner body 12 constituting the appearance of the inside of the body 10, and the outer body 11 constituting the appearance of the outside of the body 10.

As illustrated in the drawings, inner body 12 may have a cylindrical shape having an open top and may have space formed therein to receive water.

The outer body 11 may be configured to have a diameter larger than the diameter of the inner body 12 and may be installed to cover the outer side of the inner body 12. As illustrated in the drawings, the outer body 11 preferably has a cylindrical shape open in upper and lower sides.

The inner body 12 may be configured to have a diameter smaller than the diameter of the outer body 11, so a gap 102 may be defined between the inner body 12 and the outer body 11. The body 10 may have a structure having a significantly improved insulation performance, compared to a single wall structure.

Both the inner body 12 and the outer body 11 may be formed of the stainless material, and the outer body 11 may constitute the exterior of the body 10, and the inner body 12 may have space in which water is received.

Accordingly, the inner body 12 may be configured to have a diameter smaller than the diameter of the outer body 11, whereby the inner body 12 may be provided to be received inside the outer body 11, and the gap 102 having a predetermined size may be defined between the outer body 11 and the inner body 12.

The gap 102 defined between the outer body 11 and the inner body 12 may have an air layer and may prevent heat from being transmitted directly to the outer body 11.

Accordingly, the gap 102 may be referred to as an insulating gap 102. In addition, even when water received in the inner body 12 is heated to be hot, the outer body 11 may maintain a relatively low temperature.

In addition, the insulating gap 102 may communicate with space in which the heating module 50 is disposed and the inner space of the handle 40. Accordingly, although not shown, an electric wire connected to the PCB located in the handle 40 may pass through the insulating gap 102 defined between the outer body 11 and the inner body 12 and may be guided to space in which the heating module 50 is disposed.

The body 10 may be configured in such a manner that the upper and lower ends of the outer body 11 having a cylindrical shape are coupled to the upper and lower ends of the inner body 12 having a cylindrical shape, respectively.

For example, the upper and lower ends of the outer body 11 and the upper and lower ends of the inner body may be connected to each other by welding while superimposed on each other. In this case, the remaining portions except for the upper and lower ends of the outer body 11 and the inner body 12 may be spaced apart by a predetermined distance from each other to have an insulating structure.

The structure of the upper end of the body 10 will be described in more detail. The upper end of the outer body 11 and the upper end of the inner body 12 may be coupled to each other and may be fixed to each other by welding.

As illustrated in FIG. 5, an inner upper end part 121 may be formed at the upper end of the inner body 12 by extending outward therefrom and may be configured to couple the upper end of the inner body 12 to the upper end of the outer body 11.

The inner upper end part 121 may be formed by doubly extending from the inner body 12 to be stepped outward therefrom, wherein an outer end of the inner upper end part 121 may be configured to be in contact with the upper end of the outer body 11.

Accordingly, the upper portion of the gap 102 may be shielded by the inner upper end part 121. Of course, the upper end part of the outer body 11 may extend inward to be in contact with the upper end of the inner body 12.

The handle 40 and the spout 30 may be coupled to the body 10.

Specifically, the handle 40 and the spout 30 may be fastened to the upper end part of the inner body 12 and may protrude outward through the outer body 11.

Accordingly, the handle hole 111 allowing the handle 40 to be installed through the outer body 11 and a water discharge hole 112 allowing the spout 30 to be installed through the outer body 11 may be formed in the outer body 11.

Specifically, the handle hole 111 which is a rectangular cut hole may be horizontally formed through the upper end part of the right surface of the outer body 11.

In addition, the water discharge hole 112 may be horizontally formed through a side opposite to the handle hole 111. That is, the water discharge hole 112 may be formed at the upper end part of the left surface of the outer body 11 and preferably has a triangular shape to correspond to the shape of the spout 30.

An outer hole 113 and an inner hole 123 may be formed through the front surface of the outer body 11 and the front surface of the inner body 12, respectively, in a front-to-rear direction.

The outer hole 113 and the inner hole 123 are portions at which a transparent window 13 to be described later is installed. Accordingly, each of the outer hole 113 and the inner hole 123 preferably has a rectangular shape vertically long such that each of the outer hole 113 and the inner hole 123 corresponds to the shape of the transparent window 13.

Multiple water discharge holes 125 may be formed through the upper end part of the left surface of the inner body 12. The water discharge holes 125 may guide the discharge of water contained in the inner body 12 to the outside through the spout 30. Accordingly, the multiple water discharge holes 125 is preferably formed at a position corresponding to the water discharge hole 112 formed at the upper end part of the left surface of the outer body 11.

The handle bracket 15 may be installed at the upper end part of the right surface of the inner body 12. The handle bracket 15 allows the handle 40 to be coupled to and fixed to the inner body 12 and is preferably formed in a U shape (when viewed from above).

Accordingly, the left ends of the handle bracket may be coupled to the inner body 12 by welding, an adhesive, or a fastener, and the right end of the handle bracket 15 may be coupled to the handle 40.

When the handle bracket 15 is fixed to the inner body 12, the right end of the handle bracket 15 is preferably exposed to the outside (the right side of the body) through the handle hole 111 of the outer body 11 as illustrated in FIG. 5.

In addition, the handle 40 may be fastened to the handle bracket 15 by a fastening means. That is, the handle 40 may be coupled to the handle bracket 15 by the fastening means such as bolts and nuts.

The body 10 may be made of a stainless material and may be formed by processing such as welding.

Accordingly, the processed portions of the body 10 may be smoothed by electropolishing such that the surface of inner space of the body 10 receiving water maintains a smooth state.

Additionally, the body 10 may have corrosion resistance in the inner and outer surfaces through electropolishing. For this reason, the body 10 is preferably electropolished after coupling the inner body 12 to the outer body 11.

In a state in which the body 10 is formed by coupling the inner body 12 to the outer body 11, to electropolish the body 10, the body 10 may be immersed in an electrolyte and then the electropolishing of the body may be performed.

In the process, due to the structural characteristics of the body 10, the electrolyte is necessarily introduced into the insulating gap 102 defined between the inner body 12 and the outer body 11. That is, when the body 10 is immersed in the electrolyte in a state in which the body 10 is formed, the electrolyte is necessarily introduced into the gap defined between the inner body 12 and the outer body 11 since the handle hole 111 and the water discharge hole 112 are open.

When the body 10 is raised after the electropolishing is completed, the electrolyte present between the inner body 12 and the outer body 11 may be discharged to the lower side of the gap 102. That is, the lower ends of the inner body 12 and the outer body 11 may not be in contact with each other and may have space therebetween such that the bottom cover 56 is coupled to the lower ends. Prior to the coupling of a part such as the bottom cover 56, the electrolyte may be efficiently discharged to the lower side of the gap 102.

Additionally, even in case of washing the body 10 after the completion of the electropolishing of the body 10, when the body 10 is raised after the body 10 is immersed and washed in a washing solution, the electrolyte present between the inner body 12 and the outer body 11 may be naturally discharged downward through the gap 102.

Accordingly, after the electropolishing of the body 10, the electrolyte present in the body 10 may be removed, and when the body 10 is washed after the electropolishing, all liquid remaining in the body 10 may be efficiently discharged.

The transparent window 13 may be installed at the body 10. The transparent window 13 allows a user to check the height or boiling state of water contained in the electric kettle 1 from the outside of the electric kettle 1 without opening the lid 20.

The transparent window 13 may extend long in a vertical direction and may be fixed to each of the inner body 12 and the outer body 11. Preferably, the transparent window 13 may be coupled to the inner body 12.

The transparent window 13 is preferably formed to be transparent such that a user sees through the inside of the body 10 from the outside to know the amount of food such as water contained in the body 10.

A transparent window gasket 135 may be provided between the transparent window 13 and the body 10 and may be configured such that water is prevented from leaking through a gap between the transparent window 13 and the body 10. That is, the transparent window 13 may be mounted to the body 10 such that an airtight state is maintained between the transparent window 13 and the body 10.

Accordingly, the transparent window gasket 135 may be mounted between the transparent window 13 and the inner hole 123 or between the transparent window 13 and the outer hole 113. Preferably, the transparent window gasket 135 is mounted between the inner hole 123 and the transparent window 13 such that water contained in the inner body 12 is prevented from leaking.

The transparent window gasket 135 may be formed in a shape corresponding to the shape of the circumference of the transparent window 13 and may be made of an elastic material.

When the transparent window 13 is mounted to the inner hole 123 of the inner body 12, the inner surface of the transparent window 13 is preferably located on the same plane as the inner surface of the inner body 12.

Accordingly, in the state in which the transparent window 13 is mounted to the body 10, any part of the transparent window 13 may not protrude to the inside of the inner body 12, so the inner structure of the inner body may be simple and may be easy to be cleaned.

Additionally, the front surface of the transparent window 13 may also be configured to be located on the same plane as the outer surface of the outer body 11. Accordingly, in a state in which the transparent window 13 is mounted, the transparent window 13 may not protrude or may not be recessed more than the outer surface of the outer body 11, so the exterior of the outer body 11 may be further improved.

In addition, a gap between the transparent window 13 and the inner body 12 may be airtight by the transparent window gasket 135, so water contained in the body 10 may be prevented from leaking to the outside.

Of course, as required, an additional gasket or packing may be provided at the outer body 11 and may further seal a gap between the outer body 11 and the transparent window 13 such that there is no gap between the outer body 11 and the transparent window 13.

The heating module 50 may be mounted to the lower portion of the body 10. That is, the heating module 50 may be mounted to the lower surface of the inner body 12.

The heating module 50 is intended to increase the temperature of contents such as water by heating the inner space of the body 10 and to control the temperature thereof.

The heating module 50 may include: a heater assembly 51 configured to generate heat; the temperature sensor 53 measuring the temperature of water contained in the inner body 12; and the upper power module 55 configured to supply power to the heater assembly 51.

In addition, the bottom cover 56 may be provided at the lower side of the heating module 50 so as to cover remaining components except for a portion of the upper power module 55 such that the remaining components are not exposed to the lower side of the body 10.

The bottom cover 56 may be mounted to the outer body 11 through the open lower surface thereof and may constitute at least a portion of a lower part of the body 10, so the bottom cover 56 may be referred to as a bottom body.

In addition, in a state in which the assembly of the bottom body is completed, the body 10 may be seated on the base 60. That is, to operate the electric kettle 1, the body 10 with which the bottom body is assembled is required to be seated on the base 60.

In the state in which the body 10 is seated on the base 60, the upper power module 55 of the body 10 and the lower power module 64 of the base 60 may be in contact with each other, so the supply of power to the electric kettle may be performed. In this state, due to the power supply, the heater 54 may be heated and may boil water.

As illustrated in FIG. 2, the heating module 50 may be disposed at the inner side of the open lower surface of the outer body 11. When the bottom cover 56 is removed from the outer body 11, the remaining components of the heating module 50 may be exposed to the outside through the open lower surface of the outer body 11.

The heater assembly 51 may include the heating plate 52 coupled to the lower surface of the inner body 12, and the heater 54 mounted to the lower surface of the heating plate 52.

Specifically, the upper power module 55 may be disposed at the center of the lower part of the body 10, and the heater 54 may be provided at the outer side of the upper power module 55 such that the lower surface of the inner body 12 can be heated.

In addition, a cover PCB may be provided in the bottom cover 56 so as to supply power to the heater 54.

Accordingly, the upper power module 55 may be located at the center of the heating module 50. In addition, the upper power module 55 may be mounted to the center of the heating plate 52.

The heating plate 52 may be coupled to the lower surface of the inner body 12, and the heater 54 may be mounted to the heating plate 52.

The heater 54 may be configured as a sheath heater. In addition, the heater 54 may be located at a side outer than the upper power module 55 and may be disposed along the circumference of the heating plate 52.

The opposite ends of the heater 54 may be spaced apart from each other at positions adjacent to each other, and a connection terminal of each of the opposite ends of the heater spaced apart from each other may be exposed and may be connected with the cover PCB by an electric wire.

The heating plate 52 may be configured in a disk shape having a size corresponding to the size of the lower surface of the inner body 12 and may include the heater 54 mounted to the lower surface of the heating plate 52.

The heating plate 52 may be formed of aluminum or an aluminum alloy material having high thermal conductivity such that the heat of the heater 54 can be evenly transmitted to the entire lower surface of the inner body 12. In addition, the heating plate 52 and the heater 54 may be integrally formed by die casting.

The heating plate 52 may include a temperature sensor mounting hole 521 to which the temperature sensor 53 is mounted.

A sensor packing 531 may be provided in the temperature sensor mounting hole 521. Such a sensor packing 531 may seal the temperature sensor mounting hole 521.

The heating plate 52 may be mounted to the lower surface of the inner body 12. In this case, the heating plate 52 may be completely in close contact with the lower surface of the inner body 12 and may be blazed and coupled integrally to the inner body 12 to effectively perform heat transmission.

The heating plate 52 may be formed in a disk shape and may have a diameter slightly smaller than the diameter of the inner body 12.

A sensor hole 124 may be formed vertically through the bottom surface of the inner body 12 such that the upper end of the temperature sensor 53 is exposed through the sensor hole.

The sensor hole 124 may be formed at a position corresponding vertically to the temperature sensor mounting hole 521.

The temperature sensor 53 may be exposed to the upper side of the bottom surface of the inner body 12 to detect the temperature of water in the heating space 101.

Meanwhile, the temperature sensor 53 may be installed to have height of an upper end thereof corresponding to the height of the bottom surface of the inner body 12, wherein a gap between the temperature sensor 53 and the inner body 12 may be sealed by the sensor packing 531.

Accordingly, the upper end of the temperature sensor 53 may not protrude upward from the bottom surface of the inner body 12, so even when cleaning the inside of the body 10, the temperature sensor 53 may not interfere with the cleaning.

Meanwhile, the remaining components of the heating module 50 except for the bottom cover 56 may be completely received in the body 10. In addition, when the bottom cover 56 is mounted to the body 10, the bottom cover 56 may shield the remaining components of the heating module 50 provided in the body 10 and may constitute the exterior of the lower surface of the body 10.

A bottom hole 561 may be formed at the center of the bottom cover 56, and a portion of the upper power module 55 may be exposed to the outside through the bottom hole 561.

Accordingly, the upper power module 55 may be exposed to the outside through the bottom hole 561, and thus when the body 10 is mounted to the base 60, the upper power module 55 may be configured to be in contact with the lower power module 64.

Figure 8:
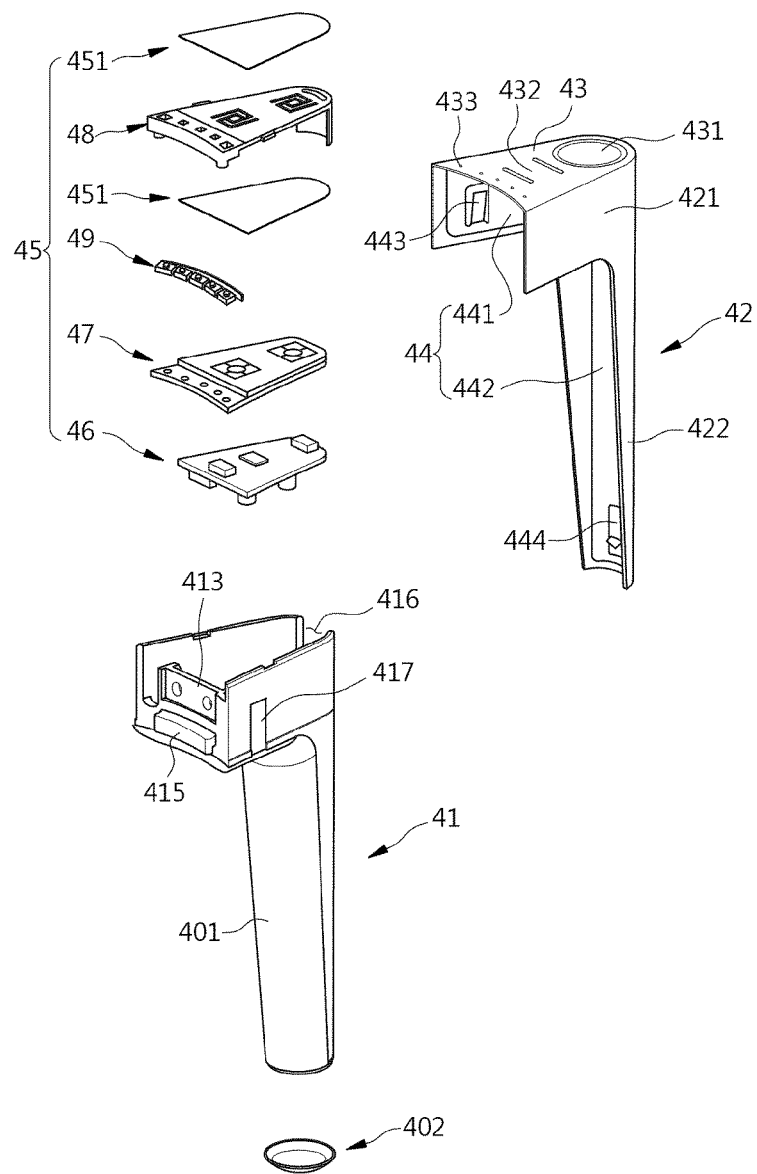
FIG. 8 is an upper side exploded perspective view illustrating the configuration of the first example of the handle constituting the electric kettle of the present disclosure according to the embodiment.
Figure 9:
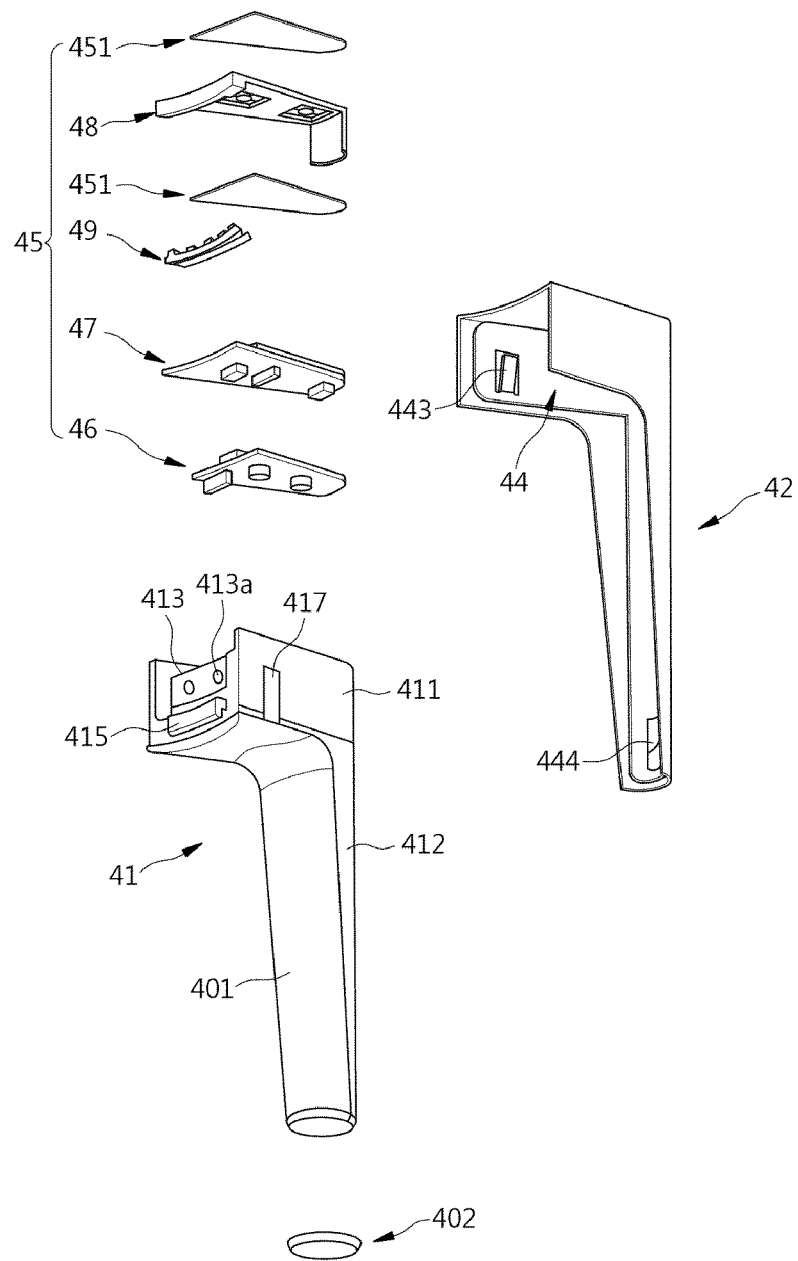
FIG. 9 is a lower side exploded perspective view illustrating the configuration of a first example of the handle constituting the electric kettle of the present disclosure according to the embodiment.
Figure 10:
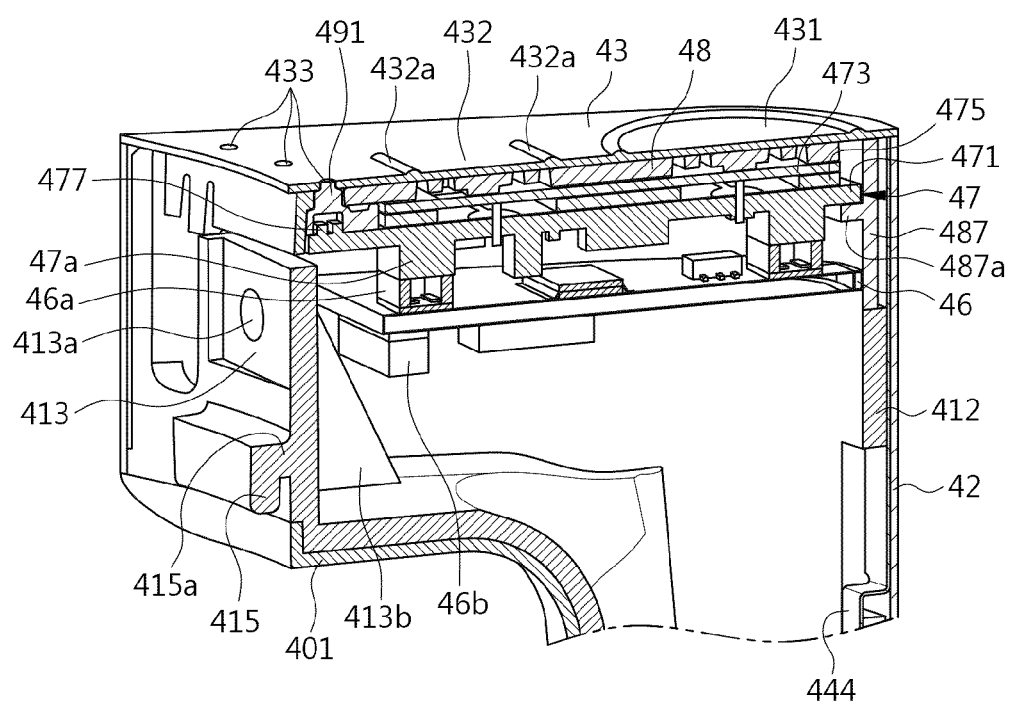
FIG. 10 is a partial cut perspective view illustrating the configuration of an upper half part of the handle constituting the electric kettle of the present disclosure according to the embodiment.
Figure 11:
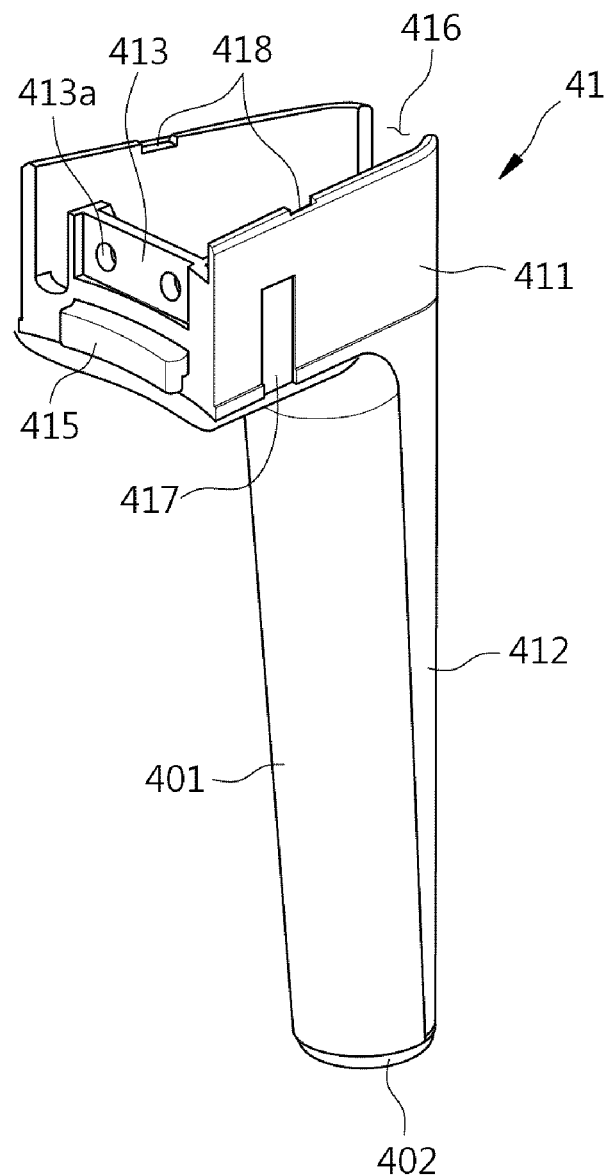
FIG. 11 is a perspective view illustrating the configuration of a handle support of the handle constituting the electric kettle of the present disclosure according to the embodiment.
Figure 12:
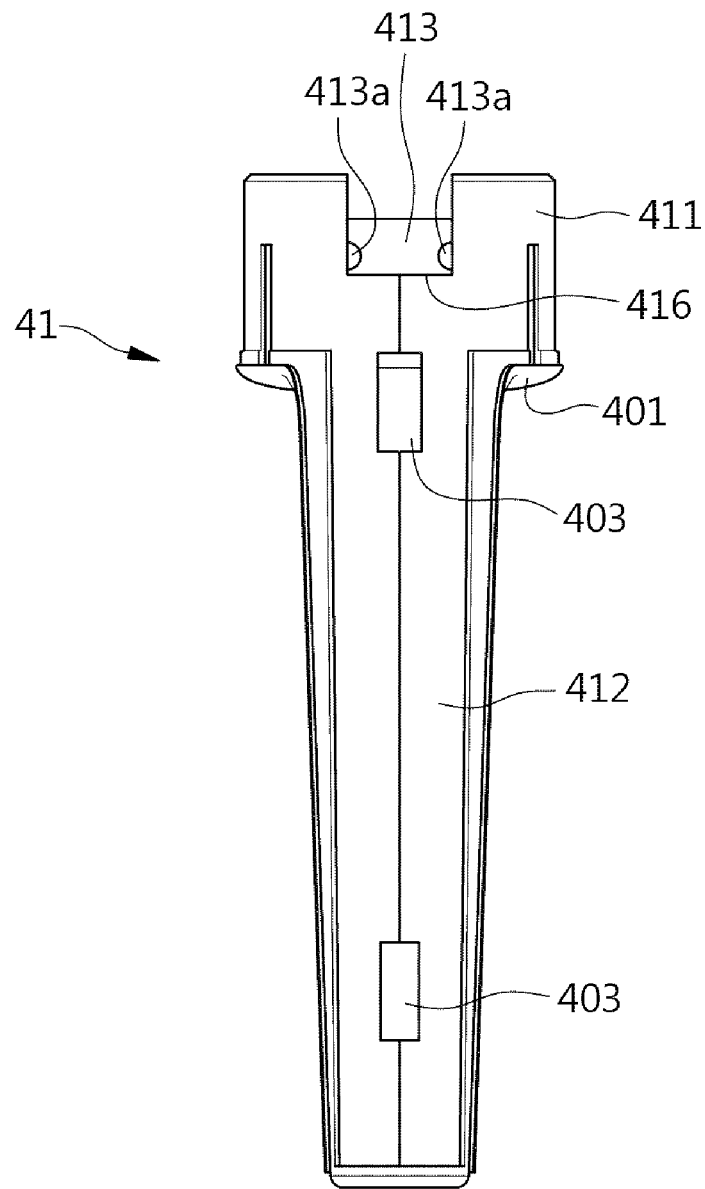
FIG. 12 is a rear view of the handle support of the handle constituting the electric kettle of the present disclosure according to the embodiment.
Figure 13:
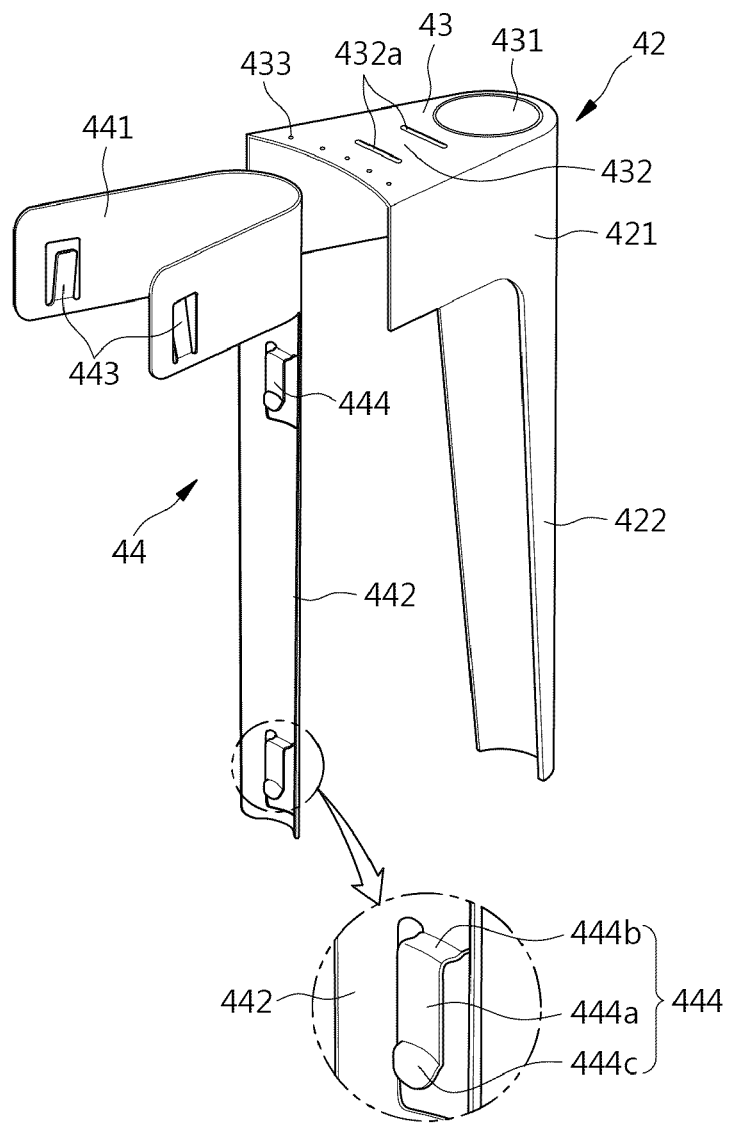
FIG. 13 is an exploded perspective view of a handle cover of the handle constituting the electric kettle of the present disclosure according to the embodiment.
Figure 14:
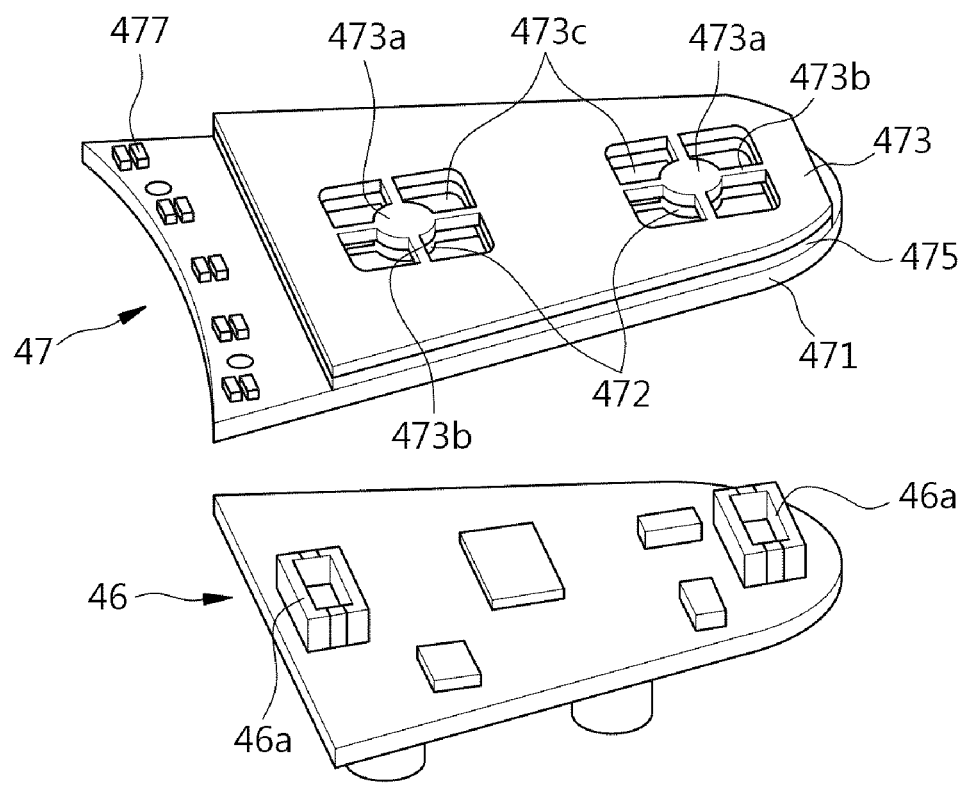
FIG. 14 is an upper side perspective view illustrating the configurations of a main PCB and a touch PCB of the handle constituting the electric kettle of the present disclosure according to the embodiment.
Figure 15:
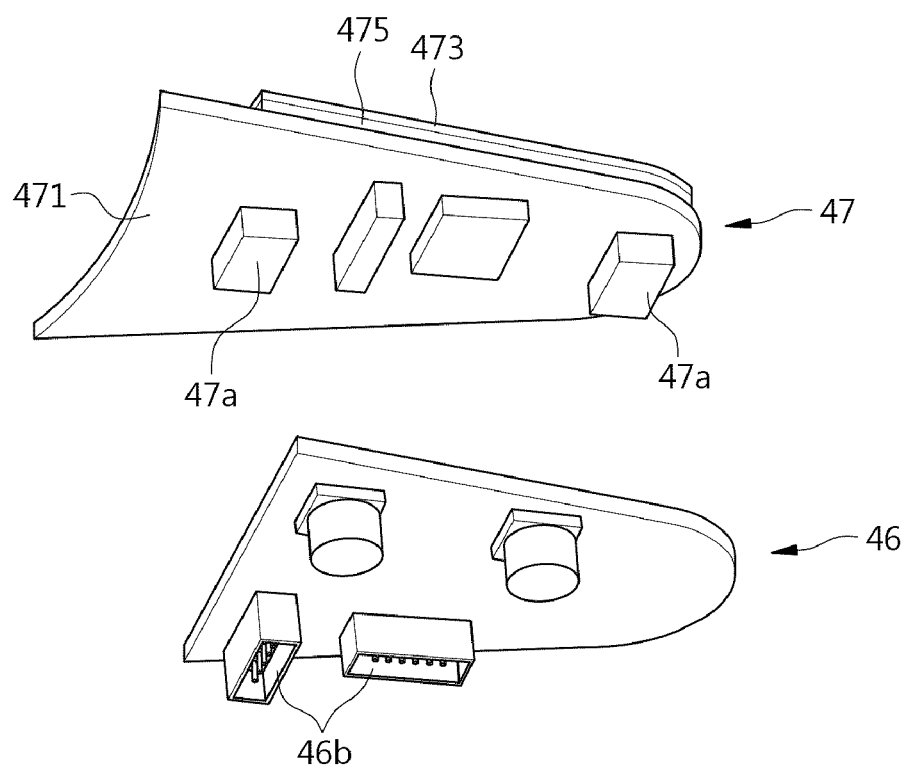
FIG. 15 is a lower side perspective view illustrating the configurations of the main PCB and the touch PCB of the handle constituting the electric kettle of the present disclosure according to the embodiment.
Figure 16:
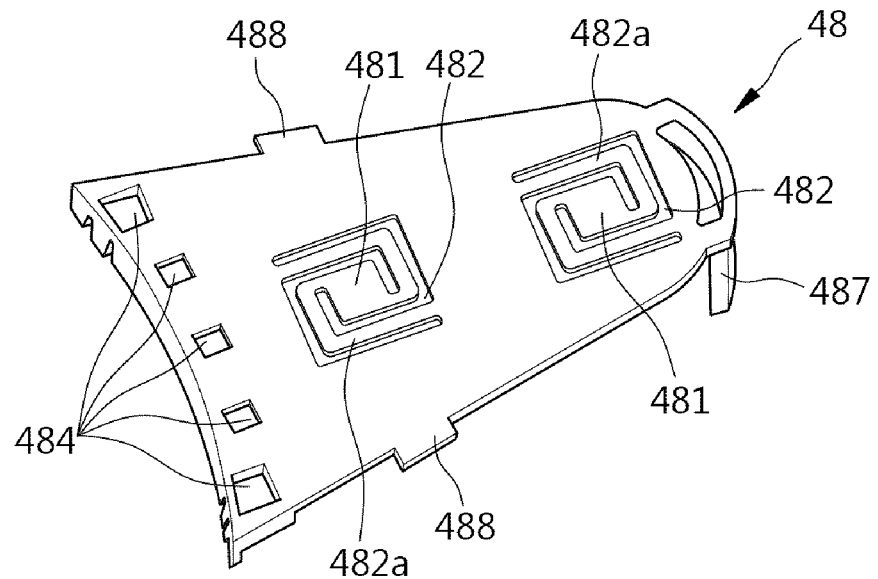
FIG. 16 is an upper side perspective view of a touch booster of the handle constituting the electric kettle of the present disclosure according to the embodiment.
Figure 17:
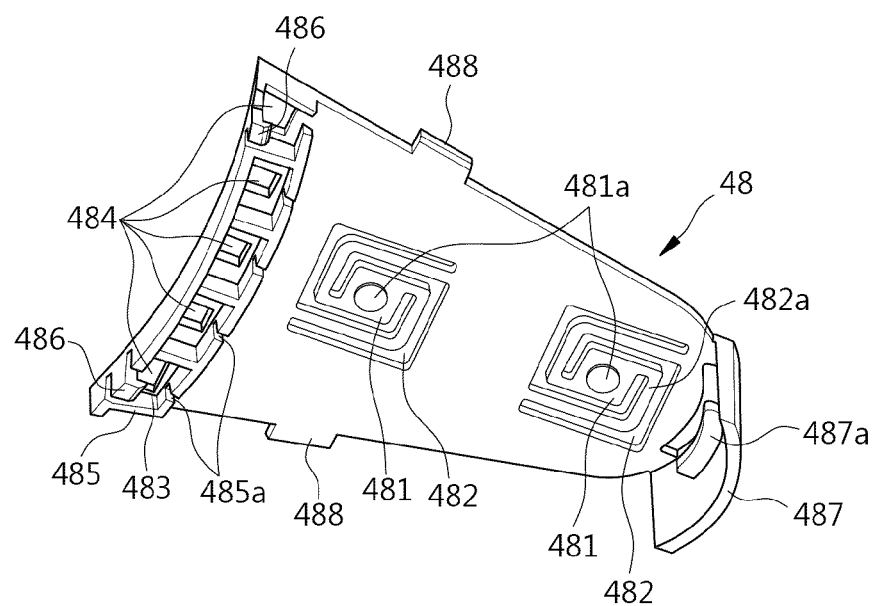
FIG. 17 is a lower side perspective view of the touch booster of the handle constituting the electric kettle of the present disclosure according to the embodiment.
Figure 18:
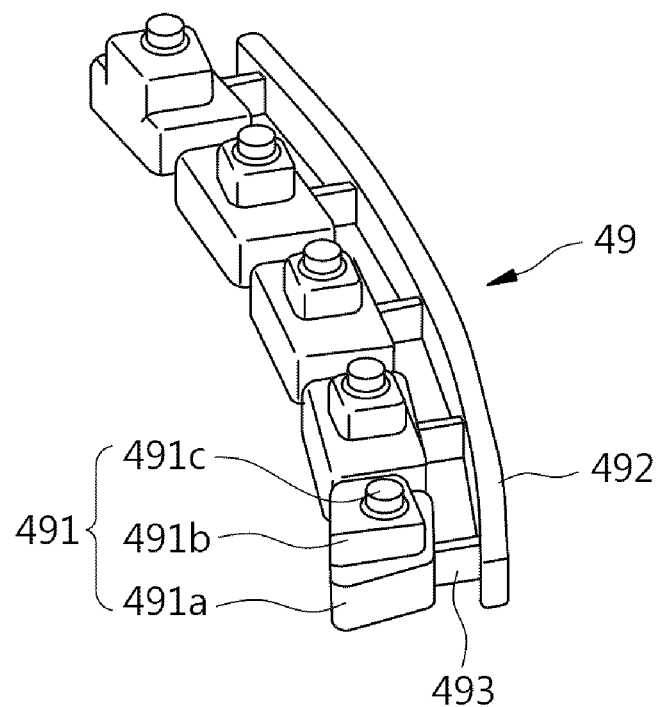
FIG. 18 is an upper side perspective view of an LED cover of the handle constituting the electric kettle of the present disclosure according to the embodiment.
Figure 19:
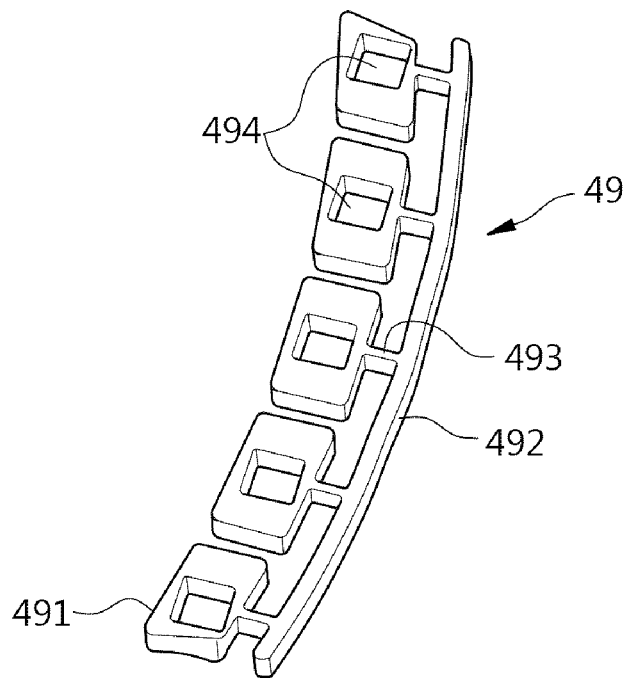
FIG. 19 is a lower side perspective view of the LED cover of the handle constituting the electric kettle of the present disclosure according to the embodiment.
Figure 20:
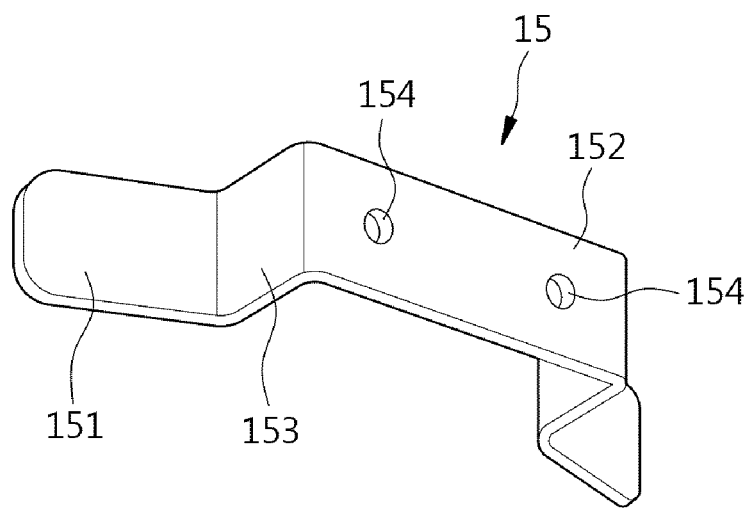
FIG. 20 is a perspective view illustrating the configuration of a handle bracket constituting the electric kettle of the present disclosure according to the embodiment.

In FIGS. 8 to 20, the configuration of the handle 40 is illustrated in detail. That is, the upper side and lower side exploded perspective views of the handle 40 are illustrated in FIGS. 8 and 9, respectively; a partial cut perspective view of the handle 40 is illustrated in FIG. 10; and the perspective view and rear view of a handle support 41 constituting the handle 40 are illustrated in FIGS. 11 and 12, respectively. In addition, an exploded perspective view of a handle cover 42 constituting the handle 40 is illustrated in FIG. 13; the upper and lower side perspective views of the configurations of a main PCB 46 and a touch PCB 47 constituting the handle 40 are illustrated in FIGS. 14 and 15, respectively; and the upper and lower side perspective views of the touch booster 48 constituting the handle 40 are illustrated in FIGS. 16 and 17, respectively. Additionally, the upper and lower side perspective views of an LED cover 49 constituting the handle 40 are illustrated in FIGS. 18 and 19, respectively; a perspective view of the configuration of the handle bracket 15 to which the handle 40 is coupled is illustrated in FIG. 20.

As illustrated in these drawings, the handle 40 may be composed of the handle support 41 constituting a frame of the handle 40 and the handle cover 42 covering multiple parts provided in the handle support 41. That is, the handle 40 may include the handle support 41 supporting multiple parts provided therein and constituting the frame of the handle 40, and the handle cover 42 coupled to the handle support 41, the handle cover covering the multiple parts installed in the handle support 41 and functioning as a decoration.

The handle support 41 may be composed of a side wall frame 411 covering parts received in the handle support, and a pillar frame 412 formed by bending downward and extending from an end of the side wall frame 411. That is, the handle support 41 may be composed of the pillar frame 412 which is a part covered by the hand of a user, and the side wall frame 411 formed at the upper side of the pillar frame 412 and having space formed therein in which a control means 45 to be described later is installed.

Specifically, the handle support 41 may be configured to have an L shape as a whole and may be coupled to the upper end part of the body 10. The handle support 41 may be composed of the side wall frame 411 coupled to the body 10 and having multiple electronic parts provided therein, and the pillar frame 412 formed by vertically bending downward and extending from an end (a rear end) of the side wall frame 411.

Of course, the pillar frame 412 may not bend vertically downward from the side wall frame 411, but may extend to have an acute angle or an obtuse angle.

A bracket fastening end 413 fastened to the handle bracket 15 may be provided in the handle support 41.

Specifically, the bracket fastening end 413 may be formed to have a predetermined size at the front end part of the side wall frame 411 of the handle support 41. That is, the front of the side wall frame 411 may be open and such an open portion thereof may be shielded by the bracket fastening end 413 having a predetermined height. The bracket fastening end 413 may be a part coupled to the handle bracket 15 by a fastening means.

Accordingly, at least one bracket fastening hole 413a may be formed through the bracket fastening end 413 in a front-to-rear direction, wherein a fastening means such as a bolt may be inserted through the bracket fastening hole.

A holding end 415 may be formed at an end of the handle support 41 by protruding outward therefrom, the holding end 415 being held in the outer body 11. That is, in the handle support 41, the holding end 415 held in the handle hole 111 of the outer body 11 may be formed by protruding downward from the front end of the side wall frame 411.

Specifically, the holding end 415 having a predetermined size may be formed at the front end of the side wall frame 411 of the handle support 41 by protruding forward therefrom. That is, the holding end 415 held in the outer body 11 may be formed at the front lower end portion of the side wall frame 411 of the pillar frame 412 by protruding forward and downward therefrom.

The holding end 415 may be formed to be spaced apart by a predetermined distance from the front end of the side wall frame 411 such that the holding end 415 is received inside the outer body 11. Accordingly, the holding end 415 may be spaced apart by a predetermined distance forward from the front end of the side wall frame 411 and may be formed to be integrated with the side wall frame 411 by a joining part 415a extending by a predetermined distance forward from the lower end of the side wall frame 411.

The holding end 415 may be formed by protruding upward or downward from the front end of the handle support 41. That is, in the embodiment, the holding end 415 is formed by protruding downward from the joining part 415a extending forward from the front end of the side wall frame 411, but such a holding end 415 may be formed by protruding upward from the front end of the side wall frame 411.

Accordingly, when the holding end 415 is formed by protruding downward from the front end of the handle support 41, the holding end 415 may be held in a lower end of the handle hole 111 of the outer body 11. Contrarily, when the holding end 415 is formed by protruding upward from the front end of the handle support 41, the holding end 415 may be held in an upper end of the handle hole 111 of the outer body 11.

At least one reinforcing rib 413b is preferably formed at a side of the bracket fastening end 413 so as to reinforce the rigidity of the bracket fastening end 413. That is, as illustrated in FIG. 10, one reinforcing rib 413b or a pair of reinforcing ribs 413b may be formed at the rear side of the bracket fastening end 413, the reinforcing rib 413b having a cross-sectional area gradually increasing downward.

Accordingly, the bracket fastening end 413 may be securely fixed to the handle support 41 by being supported by the reinforcing rib 413b.

The holding end 415 may be located inside the outer body 11, and a surface of the holding end 415 is preferably configured to have a curvature corresponding to a curvature of the inner surface of the outer body 11. That is, a rear surface of the holding end 415 may be configured to have curvature corresponding to the curvature of the inner surface of the outer body 11.

In this case, when the holding end 415 is held in the handle hole 111 of the outer body 11, the holding end 415 may be located inside the outer body 11 and the rear surface of the holding end 415 may be in contact with the inner surface of the outer body 11. Accordingly, the curvature of the rear surface of the holding end 415 may correspond to the curvature of the inner surface of the outer body 11 and thus the holding end 415 and the outer body 11 may be maintained to be in close contact with each other.

A support end groove 416 may be formed in the handle support 41 such that a booster support end 487 of the touch booster 48 to be described later is received in the support end groove 416. That is, the support end groove 416 having a U shape having an open upper portion may be formed at the rear end of the side wall frame 411.

In addition, as illustrated in the drawing, a side wall hook groove 417 may be formed at the outer surface of the side wall frame 411 by being recessed inward by a predetermined depth therefrom, and a side wall hook 443 to be described later may be inserted to and fastened to such a side wall hook groove 417.

A holding-rib groove 418 may be formed at the upper end of the side wall frame 411 by being depressed therefrom such that a holding rib 488 of the touch booster 48 to be described later is seated in the holding-rib groove 418.

The grip part 401 may be formed at the front surface of the pillar frame 412 and may be made of a plastic material or an elastic material such as rubber or silicone.

Accordingly, when the grip part 401 is made of plastic or an elastic material, a user may feel soft touch when holding the handle 40 by hand, and the slipping of the hand may be prevented.

Figure 22:
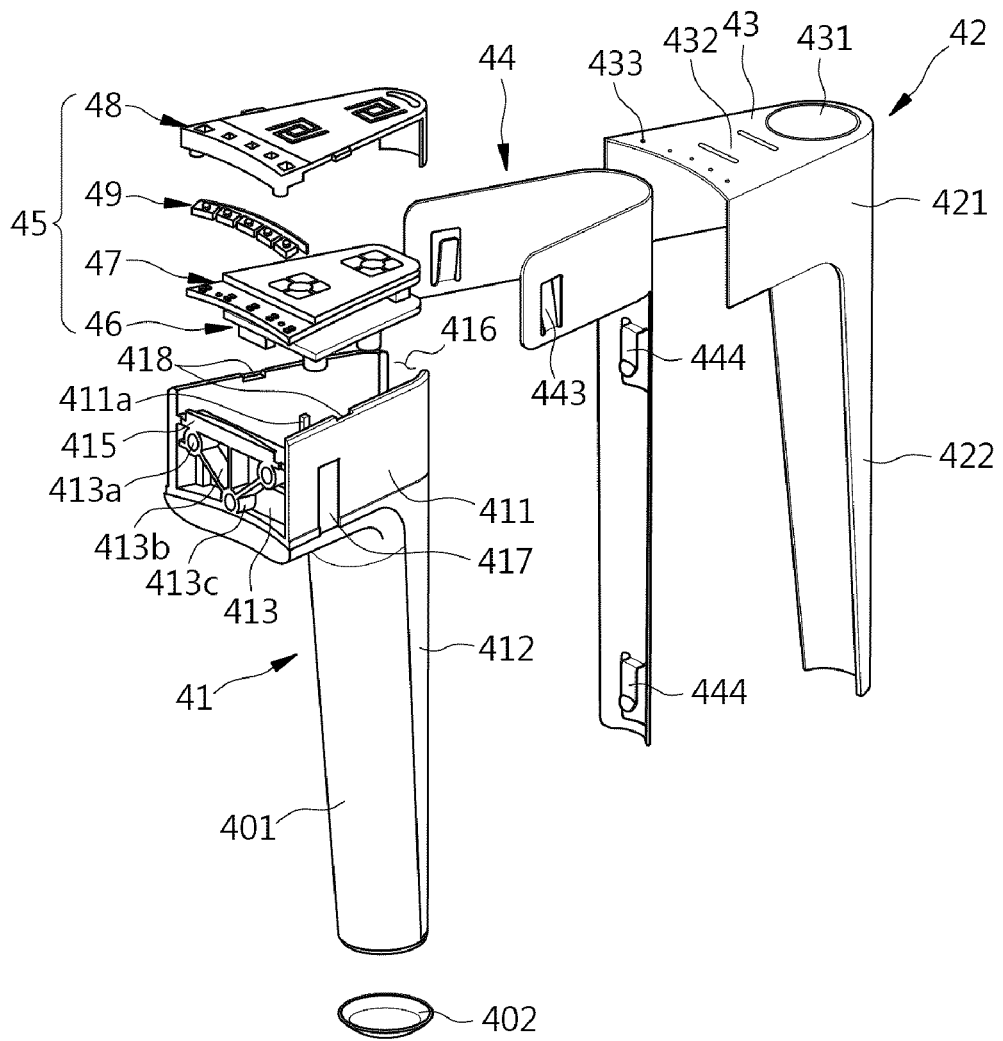
FIG. 22 is an exploded perspective view of the handle of FIG. 21.

As illustrated in FIG. 22, the grip part 401 may be configured to have a shape of an "L" (when viewed from the side of the grip part), and the front surface of the pillar frame 412 may be configured to be in close contact with the lower surface of the side wall frame 411.

The grip part 401 is preferably coupled to the pillar frame 412 or the side wall frame 411 by welding or an adhesive. The grip part 401 may be coupled to the pillar frame 412 and may have a cylindrical shape which a user can hold with a hand and may be configured to have an outer diameter gradually decreasing downward.

In addition, the grip part 401 may have a corrugated or wrinkled shape formed at a surface thereof such that when a user holds the grip part with a hand, the hand is prevented from slipping, whereby the grip part 401 may be configured to be safely held such that the electric kettle 1 can be raised.

Accordingly, when the grip part 401 is formed of a material with high frictional force, such as rubber or silicone, the hand of a user may further be prevented from slipping when holding the handle 40.

A handle cap 402 may be provided at the lower surface of the pillar frame 412. The handle cap 402 may cover the lower end of the handle 40 and may be coupled to the pillar frame 412 by welding or an adhesive, or by forcible fitting, or by a separate fastening means.

At least one pillar hook hole 403 may be formed through the rear surface (a front surface in FIG. 12) of the pillar frame 412 in a front-to-rear direction. In the present disclosure, two pillar hook holes 403 are illustrated to be formed vertically. The pillar hook 444 to be described later may be fastened to each of such pillar hook holes 403.

The handle cover 42 is preferably made of stainless steel as the body 10 is made of stainless steel and may form the outer shape of the handle 40, so the handle cover 42 may function as a decoration.

The handle cover 42 may be composed of the pillar piece 422 covering at least one surface of the pillar frame 412; a side piece 421 formed at the upper side of the pillar piece 422 and covering the outer part of the side wall frame 411; and a top piece 43 formed at a side of the side wall frame 411 and shielding the open upper portion of the side wall frame 411.

As illustrated in FIG. 13, the pillar piece 422 may be configured to cover the rear surface of the pillar frame 412. Accordingly, the pillar piece 422 is preferably configured to correspond to the curvature and shape of the rear surface of the pillar frame 412.

The side piece 421 is a part covering the side wall frame 411 of the handle support 41. Accordingly, the side piece 421 may be formed to be integrated with the upper side of the pillar piece 422.

The top piece 43 may shield the open upper portion of the side wall frame 411 of the handle support 41, may be formed to be integrated with the upper end of the side piece 421, and may be made of a flat plate having a predetermined thickness.

Such a handle cover 42 may constitute the exterior of the handle 40 and may be made of a rigid and smooth material such as stainless steel such that the handle cover has a luxurious texture.

The handle cover 42 may be configured to be fastened to the handle support 41 by a hook coupling. That is, the handle cover 42 may further include hooks, and thus the handle support 41 and the handle cover 42 may be coupled to each other by a one-touch action.

Specifically, a cover bracket 44 may be provided at the inner surface of the handle cover 42. Such a cover bracket 44 may be provided with at least one hook.

The cover bracket 44 is preferably coupled integrally to the handle cover 42. That is, the cover bracket 44 may be in close contact with and fixed to the inner surface of the handle cover 42 by welding or an adhesive.

The cover bracket 44 may be composed of a side part 441 configured in a shape corresponding to the outer surface of the side wall frame 411, and a pillar part 442 having a shape corresponding to the outer surface of the pillar frame 412. Accordingly, the cover bracket 44 may be configured to correspond to the outer surface of the handle support 41.

Accordingly, the pillar part 442 is preferably formed to be vertically long such that the pillar part 442 has a curvature corresponding to the rear surface of the pillar frame 412 of the handle support 41. The side part 441 is preferably formed in a "U" shape (when viewed from above) such that the side part 441 corresponds to the outer surface of the side wall frame 411.

Of course, the cover bracket 44 may have a shape corresponding to the shape and curvature of the inner surface of the handle cover 42 and may be in close contact with and fixed to the inner surface of the handle cover 42.

The hook 443 or 444 and the hook groove 403 or 417 may be formed at the cover bracket 44 and the handle support 41, respectively, the hook 443 or 444 and the hook groove 403 or 417 being configured to have shapes corresponding to each other to be fastened to each other. That is, while the cover bracket 44 is attached integrally to the handle cover 42, the cover bracket 44 may be coupled to the handle support 41 by a one-touch action such that the handle cover 42 is coupled to the handle support 41.

Accordingly, the handle support 41 and the cover bracket 44 may be provided with the hook grooves 403 and 417 and the hooks 443 and 444, respectively, each of the hook grooves and each of the hooks being coupled to each other, wherein each of the hooks 443 and 444 and each of the hook grooves 403 and 417 may include at least one hook and at least one hook groove provided at positions corresponding to the side part 441 and the side wall frame 411, respectively, and at positions corresponding to the pillar part 442 and the pillar frame 412, respectively. That is, the hooks 443 and 444 may include the side wall hook 443 provided at the side part 441 of the cover bracket 44, and the pillar hook 444 provided at the pillar part 442 of the cover bracket 44, wherein the side wall hook 443 and the pillar hook 444 may be formed by being cut and bent from the cover bracket 44.

More specifically, as described above, a pair of side wall hook grooves 417 may be formed at opposite side surfaces, respectively, of the side wall frame 411 of the handle support 41 by being recessed by predetermined depth inward therefrom.

In addition, the pillar hook hole 403 may be formed in the rear surface of the pillar frame 412 of the handle support 41. The pillar hook hole 403 is preferably formed through the rear surface the pillar frame 412 in a front-to-rear direction. Of course, the pillar hook hole 403 may be configured as the shape of a groove formed by being recessed by predetermined depth inward (forward) from the rear surface of the pillar frame 412 in addition to the shape of a hole formed through the rear surface of the pillar frame 412 forward and rearward.

Meanwhile, the side wall hook 443 and the pillar hook 444 may be formed at the cover bracket 44.

As illustrated in FIG. 13, the side wall hook 443 may be formed by cutting a predetermined portion of the side part 441 of the cover bracket 44, and the pillar hook 444 may be formed by cutting a predetermined portion of the pillar part 442 of the cover bracket 44.

The side wall hook 443 may be formed at a position corresponding to the side wall hook groove 417 of the side wall frame 411. Accordingly, when the handle cover 42 and the handle support 41 are coupled to each other, the side wall hook 443 may be configured to be received in the side wall hook groove 417.

In addition, as illustrated in FIG. 13, a lower end of the side wall hook 443 is connected to the side part 441, and an upper end of the side wall hook 443 may be formed by being bent inward. In this case, when the handle cover 42 and the handle support 41 are coupled to each other, the upper end part of the side wall hook 443 may be received in the side wall hook groove 417 such that the handle cover 42 is prevented from being removed upward from the handle support 41.

The pillar hook 444 may be formed at a position corresponding to the pillar hook hole 403 of the pillar frame 412, and when the handle cover 42 and the handle support 41 are coupled to each other, the pillar hook 444 may be configured to be inserted into and held in the pillar hook hole 403.

In addition, as illustrated in FIG. 13, the pillar hook 444 may be connected to the pillar part 442 at the upper end of the pillar hook and may be configured to be spaced apart by a predetermined distance forward from the pillar part 442 at the lower end of the pillar hook. In this case, to couple the handle cover 42 and the handle support 41 to each other, the handle cover 42 may be moved downward with the handle cover 42 being in close contact with the rear surface of the handle support 41. In this case, the pillar hook 444 may be naturally inserted into the pillar hook hole 403 and thus the handle cover 42 may be maintained to be in close contact with the handle support 41.

More specifically, the pillar hook 444 may include a receiving part 444a cut from the pillar part 442 and formed at a position spaced apart from the pillar part 442; a support part 444b bending from a first end (an upper end) of the receiving part 444a and connecting the receiving part 444a and the pillar part 442 to each other; and a guide part 444c formed by bending and extending from a second end (a lower end) of the receiving part 444a.

Accordingly, the pillar hook 444 may be configured to have an L shape (when viewed at the right side) as a whole, and the guide part 444c located at the lower end of the pillar hook 444 may bend forward (to the left side when viewed at the right side). In addition, a distance between the receiving part 444a and the pillar part 442 may have a size corresponding to the thickness of the rear surface of the pillar frame 412.

In this case, when the handle cover 42 is moved downward while being in close contact with the rear surface of the handle support 41, the guide part 444c of the pillar hook 444 may be naturally inserted into the pillar hook hole 403, and when the handle cover 42 is continuously moved downward, the receiving part 444a may be inserted into the pillar frame 412, so the handle cover 42 may be coupled to the handle support 41.

In addition, at least one rib supporting the PCB may be provided at the inner side of the side wall frame 411.

The handle bracket 15 may include an attaching part 151 coupled to the inner body 12; a fastening part 152 coupled to the bracket fastening end 413; and a connecting part 153 connecting the attaching part 151 and the fastening part 152 to each other, the attaching part 151 and the fastening part 152 being spaced apart from each other.

The attaching part 151 may be configured to have a curvature corresponding to the outer surface of the inner body 12 and may be fixed to the inner body 12 by welding or an adhesive. In addition, in the embodiment of the present disclosure, the attaching part 151 is illustrated to include a pair of attaching parts formed by being spaced horizontally apart by a predetermined distance from each other, but the attaching part 151 may include at least three attaching parts.

The fastening part 152 may be a part coupled to the bracket fastening end 413 by a fastening means. Accordingly, such a fastening part 152 may be configured as a flat plate having a predetermined thickness to correspond to the bracket fastening end 413 and may have at least one fastening hole 154 formed therethrough in a front-to-rear direction such that a bolt is inserted into the fastening hole 154.

Meanwhile, the handle 40 may be provided with the control means 45 configured to control power supplied to the heating module 50 or to control the temperature of contents contained inside the body 10.

The control means 45 may be provided between the handle support 41 and the handle cover 42. That is, space having a predetermined size may be defined inside the side wall frame 411 constituting the handle support 41 of the handle 40, and the control means 45 including multiple electronic parts may be installed in such space.

Meanwhile, the top piece 43 of the handle cover 42 may be configured to have a manipulation part by which a user manipulates the operation of the electric kettle 1 and a display part through which a user can check the operation state of the electric kettle 1.

The top piece 43 of the handle cover 42 may be provided with a first manipulation part 431 pressed or touched by a user such that power supplied into the electric kettle 1 can be on/off, and a second manipulation part 432 pressed or touched by a user such that the temperature of the inside of the body 10 can be set or controlled.

Figure 21:
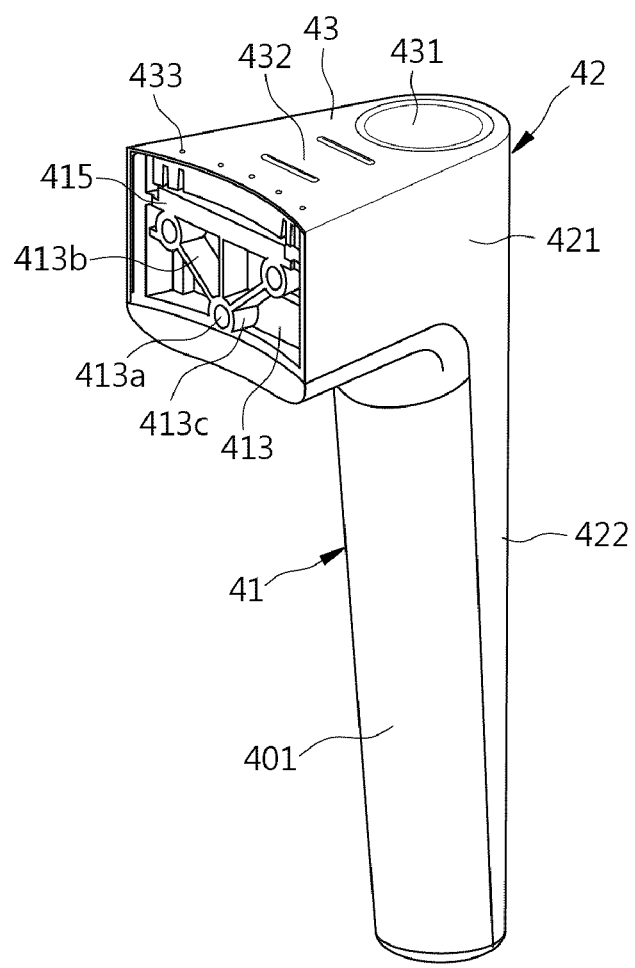
FIG. 21 is a perspective view illustrating the configuration of a handle constituting the electric kettle of the present disclosure according to a second embodiment.

As illustrated in FIG. 21, the first manipulation part 431 may be formed in the shape of a circular flat plate and may configured to have elasticity in at least a center part thereof such that the center part can vertically move.

The second manipulation part 432 may be provided at the front side of the first manipulation part 431 and may also be configured to have elasticity such that the second manipulation part 432 moves vertically. Accordingly, a cut line 432a having a predetermined size may be formed at each of the front and rear of such a second manipulation part 432 such that the second manipulation part 432 can vertically move to some extent.

Multiple through holes 433 may be formed at the front of the second manipulation part 432, that is, at a portion of the top piece 43 adjacent to the body 10 by passing vertically therethrough. Each of the through holes 433 may be a hole allowing the light of a light emitting element 477 to be described later to pass through the upper side of the top piece 43 such that a user can recognize the light.

In addition, a temperature indicator may be printed beside such a through hole 433 such that the temperature indicator indicates the temperature of light emitted through the through hole 433.

The control means 45 may include: the main PCB 46 in which multiple control parts are provided; the touch PCB 47 configured to detect pressing or touching transmitted through the first manipulation part 431 or/and the second manipulation part 432 of the top piece 43; and the touch booster 48 configured to transmit the pressing or touching of the first manipulation part 431 or/and the second manipulation part 432 of the top piece 43 to the touch PCB 47 without malfunctioning.

More specifically, the touch booster 48 may be installed to be in close contact with the lower side of the top piece 43 of the handle cover 42. In addition, a double-sided tape 451 may be used between the touch booster 48 and the top piece 43 of the handle cover 42 such that the touch booster 48 is in close contact with and fixed to the lower surface of the top piece 43.

The touch PCB 47 may be installed at the lower side of the touch booster 48. The touch PCB 47 is preferably installed to be in close contact with the lower surface of the touch booster 48. To this end, the double-sided tape 451 may be used between the touch booster 48 and the touch PCB 47 for the coupling of the touch booster 48 and the touch PCB 47 to each other.

The main PCB 46 may be provided at the lower side of the touch PCB 47.

The main PCB 46 is intended to set various functions of the electric kettle 1 or to control operation thereof, wherein multiple electronic parts are installed in the main PCB. That is, the main PCB 46 may have a function of controlling the overall operation of the electric kettle 1 and may be connected to the heating module 50 so as to control the operation of the heater 54.

The main PCB 46 may be coupled to the touch PCB 47. To this end, at least one upper connector 47a and at least one lower connector 46a may be provided at the touch PCB 47 and the main PCB 46, respectively, such that the upper connector 47a and the lower connector 46a have shapes corresponding to each other to be fastened to each other.

In addition, a connection connector 46b for power connection or data input/output may be provided at the lower side of the main PCB 46.

The touch PCB 47 may include: an indicator board 471 having a sensor detecting the pressing or touching of the first manipulation part 431 or the second manipulation part 432 formed at the top piece 43 of the handle cover 42; a touch board 473 configured to transmit the pressing transmitted from a touch transmission part 481 of the touch booster 48 to the sensor of the indicator board 471; and a protection board 475 provided between the indicator board 471 and the touch board 473, wherein the protection board may protect the sensor provided in the indicator board 471 such that the sensor is blocked from external interference.

Accordingly, the touch PCB 47 preferably consists of three layers, and the indicator board 471 may be provided at the lowest side of the touch PCB 47 such that a sensor detecting the manipulation of a user such as a touch sensor 472 is installed at the indicator board; the protection board 475 may be provided on the indicator board 471, the protection board protecting the parts such as the touch sensor 472 such that the parts such as the touch sensor 472 do not interfere with external other parts; and the touch board 473 may be provided on the protection board 475, the touch board being configured to transmit the pressing transmitted from the touch booster 48 to the touch sensor 472.

The touch sensor 472 may be configured as a piezo-type touch sensor using a piezoelectric element so as to prevent misdetection and to effectively detect the touch of the handle cover 42 made of a stainless material. That is, during the manipulation of the manipulation part 431 or 432, the transformation of the top piece 43 of the handle cover 42 may be detected such that touching by a user is recognized, so the misrecognition of the handle 40 which is frequently touched by the hand of a user may be prevented and the valid manipulation of the handle 40 may be effectively recognized.

The touch sensor 472 is preferably provided at a position vertically corresponding to the manipulation part 431 or 432. Accordingly, when a user presses the manipulation part 431 or 432, the touch sensor 472 may detect the pressing of the user and may generate a signal for operation of the electric kettle.

Multiple light emitting elements 477 may be provided at a side or end of the touch PCB 47, the light emitting elements 477 externally displaying the temperature state or setting of the body 10. That is, multiple light emitting elements 477 may be provided at the front end (a left end in FIG. 14) of the touch PCB 47. The light emitting elements 477 may be disposed at positions corresponding vertically to the through holes 433 such that the number of the light emitting elements 477 is the same as the number of the through holes 433.

More specifically, multiple light emitting elements 477 may be provided at the front end (the left end in FIG. 14) of the indicator board 471. In the embodiment of the present disclosure, five sets of the light emitting elements 477 are illustrated to be formed at the same intervals, wherein a pair of two LEDs emitting red and white light is provided at a light emitting element 477.

Accordingly, it is possible to indicate the heated state or heat-retaining state of contents contained in the body 10 with different light. That is, for example, when the contents continues to be heated, a white LED of LEDs of the light emitting elements 477 may be turned on to indicate a heated state of the contents, and when the contents are in the heat-retaining state after the heating is completed, a red LED of the light emitting elements 477 may be turned on and emit red light through the through hole 433 such that a user can check the heat-retaining state with eyes.

Accordingly, the multiple light emitting elements 477 may be installed at the same intervals at the front end of the touch PCB 47 and may be provided as pairs of at least two LEDs emitting light of different colors.

The LED cover 49 may be provided at a side of the touch PCB 47, the LED cover 49 covering the light emitting elements 477. That is, the LED cover 49 may be provided at the upper side of the light emitting elements 477 installed at the upper surface of the touch PCB 47 and may cover the upper side of the light emitting elements 477.

The LED cover 49 may be made of a transparent or translucent material such that light emitted from the light emitting elements 477 passes through the LED cover 49. The LED cover 49 may be made of an elastic material.

The LED cover 49 may be formed of a material through which light can pass and may be formed of a material through which light can be diffused or dispersed if necessary such that light emitted from the light emitting elements 477 shines brighter.

The LED cover 49 may include: multiple individual covers 491 covering the multiple light emitting elements 477, respectively; a cover stand 492 formed at a position spaced apart from the individual covers 491 and supporting the multiple individual covers 491; and cover connecting parts 493 connecting the multiple individual covers 491 to the cover stand 492.

The multiple individual covers 491 may cover sets of the light emitting elements 477 described above, respectively, that is, a total of five sets of the light emitting elements 477 including pairs of two LEDs (red and white LEDs) configured as a set. In addition, each of the individual covers 491 may be connected to the cover stand 492 having a predetermined curvature.

An LED recess 494 may be formed at the individual cover 491 by being recessed to a side therefrom such that the light emitting element 477 is received in the LED recess 494. That is, the individual cover 491 may be installed to cover the upper side of the light emitting element 477. Accordingly, the LED recess 494 may be formed at the lower surface of the individual cover 491 by being recessed upward therefrom. Such an LED recess 494 is a part receiving each of the light emitting elements 477 when the LED cover 49 covers the light emitting elements 477.

The individual cover 491 may include: a base dome 491a in contact with a surface of the touch PCB 47; a middle dome 491b having a size smaller than the size of the base dome 491a; and a top dome 491c having a size smaller than the size of the middle dome 491b.

Specifically, the base dome 491a may constitute the lower end of the individual cover 491 and may be a part in close contact with the upper surface of the touch PCB 47. The base dome 491a may be formed to have predetermined thickness and may be a part received in a cover recess 483 of the touch booster 48 to be described later.

The middle dome 491b may be a part formed at the upper surface of the base dome 491a by protruding by a predetermined height upward therefrom and may be formed to have a flat cross-section smaller than the base dome 491a. The middle dome 491b may be a part received in a middle hole 484 of the touch booster 48 to be described later. Accordingly, the middle dome 491b may be configured to have a rectangular cross section corresponding to the middle hole 484 to be described later.

As illustrated in FIG. 18, the top dome 491c may be formed by protruding upward from the upper surface of the middle dome 491b and may have a size smaller than the size of the middle dome 491b. The top dome 491c may be a part inserted and fitted into the through hole 433 formed at the top piece 43 of the handle cover 42.

Accordingly, the top dome 491c preferably has a shape (a circular shape) corresponding to the through hole 433, wherein the outer diameter of the top dome 491c may have a size corresponding to the size of the inner diameter of the through hole 433. More preferably, the top dome 491c may be configured to be coupled to the through hole 433 by a forcible fitting such that water is not introduced to the inside of the handle 40 from the outside thereof thorough the through hole 433.

The touch booster 48 is preferably configured overall to have a size and a shape corresponding to the top piece 43 of the handle cover 42.

The touch transmission part 481 may be formed at the touch booster 48 such that the touch transmission part 481 transmits the pressing of the first manipulation part 431 or the second manipulation part 432 formed at the top piece 43 of the handle cover 42 to the touch PCB 47. That is, the touch transmission part 481 may be formed at the touch booster 48 such that touch transmission part 481 is located at each of positions overlapping the installation positions of the first manipulation part 431 or the second manipulation part 432.

The touch transmission part 481 may be located at the lower side of the center of the first manipulation part 431 or the second manipulation part 432 formed at the top piece 43 of the handle cover 42.

The touch transmission part 481 may be formed to be spaced apart from the touch booster 48 and may be installed to be connected to the touch booster 48 by a connecting rib 482a having a predetermined length such that the touch transmission part 481 elastically moves vertically. That is, the touch transmission part 481 is preferably configured to have elasticity such that a center portion of the touch transmission part 481 moves to some extent vertically.

More specifically, a booster hole 482 may be formed vertically through the touch booster 48 such that the booster hole 482 is located at a position corresponding to a lower side of each of the first manipulation part 431 and the second manipulation part 432 of the handle cover 42, wherein the touch transmission part 481 may be configured as a rectangular plate having a predetermined size at the center of the booster hole 482.

In addition, the touch transmission part 481 may have a size smaller than the size of the booster hole 482. Accordingly, to connect the touch transmission part 481 to the touch booster 48, the connecting rib 482a may be provided.

The connecting rib 482a may be configured to have an L shape or an inverted shape of the L shape (when viewed from above), whereby the opposite ends of the connecting rib 482a may be connected integrally with the touch transmission part 481 and the touch booster 48, respectively.

Accordingly, the reason in which the touch transmission part 481 located at the center of the booster hole 482 is formed to be connected to the touch booster 48 by the connecting rib 482a is to efficiently transmit pressing performed by a user to the touch PCB 47 and prevent malfunction of the electric kettle. That is, the touch transmission part 481 may have elasticity and be vertically moved due to the connecting rib 482a, and in a case in which the pressing is not precisely performed on each of the first manipulation part 431 and the second manipulation part 432 of the handle cover 42, the pressing may not be transmitted to the touch PCB 47 to prevent the malfunction.

A press protrusion 481a may be formed at a surface of the touch transmission part 481 by protruding to a side therefrom. That is, as illustrated in FIG. 17, the press protrusion 481a may be formed on the lower surface of the touch transmission part 481 by protruding downward therefrom. The press protrusion 481a may have a cylindrical shape having a predetermined thickness and may be configured to have a predetermined length, whereby the press protrusion 481a may be installed to be in contact with the upper surface of a board pressing part 473a to be described later or to overlap the upper surface of a board pressing part 473a located at a position spaced apart therefrom.

The board pressing part 473a may be provided at the touch board 473 and may be configured to be in contact with the press protrusion 481a of the touch booster 48 and to transmit pressure applied from the press protrusion 481a to the sensor of the indicator board 471.

The board pressing part 473a and the touch board 473 may be formed to be spaced apart from each other and may installed to be connected to each other by at least one touch rib 473b such that the board pressing part 473a can move vertically.

Specifically, like the touch transmission part 481, the board pressing part 473a may also be formed to have elasticity such that the board pressing part can move vertically. That is, a board hole 473c may be formed vertically through the touch board 473 such that the board hole 473c is located at a position corresponding to the formed position of the booster hole 482 of the touch booster 48, and the board pressing part 473a may be provided at the center of such a board hole 473c.

In addition, the board pressing part 473a may be connected integrally to the touch booster 48 by the touch rib 473b formed in front to rear and side to side directions. Accordingly, the board pressing part 473a may vertically move by a predetermined distance and may detect only a precise pressing transmitted from the touch booster 48.

The touch booster 48 may include the cover recess 483 in which the base dome 491a of the individual cover 491 is received to be mounted thereto, and the middle hole 484 in which the middle dome 491b of the individual cover 491 is inserted to be installed thereat.

In addition, a cover wall 485 may be formed at the front end (a left end in FIG. 17) of the touch booster 48 by protruding from a surface of the touch booster 48 such that the cover wall 485 constitutes an edge of the cover recess 483. That is, the cover wall 485 having a rectangular shape may be formed at a lower surface of the left end (in FIG. 17) of the touch booster 48 by protruding downward therefrom. The cover recess 483 having a predetermined size may be formed inside such a cover wall 485 by being recessed upward therefrom.

When the LED cover 49 is coupled to the lower side of the touch booster 48, the cover recess 483 may be a part in which the base dome 491a of the LED cover 49 is received.

The middle hole 484 may be formed vertically through the upper surface of the cover recess 483 and may be formed in a rectangular shape corresponding to the middle dome 491b of the LED cover 49 described above. In addition, when the LED cover 49 is coupled to the lower side of the touch booster 48, the middle dome 491b of the LED cover 49 may be inserted into the middle hole 484.

A connecting groove 485a may be formed at a side of the cover wall 485 by being recessed therefrom such that each of the cover connecting parts 493 is received in the connecting groove. That is, the connecting groove 485a may be formed at the right wall of the cover wall 485 (in FIG. 17) by being recessed upward therefrom. When the LED cover 49 is coupled to the lower side of the touch booster 48, such a connecting groove 485a may be a part in which the cover connecting part 493 of the LED cover 49 is received.

A cover hook 486 may be formed at a side of the cover wall 485, the cover hook holding the base dome 491a such that the base dome 491a received in the cover recess 483 is not removed therefrom to the outside. That is, as illustrated in FIG. 17, the cover hook 486 may be provided as a pair of cover hooks formed at the left end of the cover wall 485 by protruding downward and to the right side therefrom and may hold the base dome 491a such that the base dome 491a received in the cover recess 483 is not removed downward therefrom.

The booster support end 487 may be formed at an end of the touch booster 48 by protruding downward therefrom such that the booster support end 487 is received in the upper end of the pillar frame 412 of the handle support 41. That is, the booster support end 487 may be formed at the right end (in FIG. 17) of the touch booster 48 by protruding downward and extending therefrom and may be a part received in the support end groove 416 of the handle support 41 described above.

Accordingly, when the lower end of the booster support end 487 is seated on the lower end of the support end groove 416 of the handle support 41, the touch booster 48 may be stably placed on the handle support 41.

Accordingly, when fastening the booster support end 487 to the handle support 41, the booster support end 487 is not required to have a separate screw or a fastening means. That is, when the lower end of the booster support end 487 is seated on the lower end of the support end groove 416 of the handle support 411, the weight of the touch booster 48 may be supported by the lower end of the support end groove 416, and when the handle cover 42 is mounted on the touch booster 48, the touch booster 48 may be prevented from shaking to the outside (a rear side) by the inner surface of the handle cover 42.

In addition, the booster support end 487 is preferably configured to have curvature corresponding to the rear surface of the pillar frame 412 of the handle support 41.

A board support jaw 487a may be formed at a surface of the booster support end 487 by protruding to a side therefrom, the board support jaw 487a supporting an end of the touch PCB 47 or the main PCB 46. That is, the board support jaw 487a may be formed at the inner surface of the booster support end 487 (a right surface thereof in FIG. 17) by protruding to the left side (in FIG. 17) therefrom.

The rear end of the indicator board 471 of the touch PCB 47 may be placed on and supported by the board support jaw 487a.

In addition, although not shown, such a board support jaw 487a may be further formed at the lower end of the booster support end 487 to support the rear end of the main PCB 46.

Accordingly, when at least one board support jaw 487a is formed on the inner surface (a front surface) of the booster support end 487 by protruding horizontally therefrom and supports the touch PCB 47 or the main PCB 46, the touch PCB 47 or the main PCB 46 may be completely mounted to the handle support 41 without being required to be fastened by a screw.

Additionally, as illustrated in the drawings, the outer edge of each of the touch booster 48, the touch PCB 47, and the main PCB 46 may be configured to correspond to the shape and size of the inner surface of the side wall frame 411 of the handle support 41. Accordingly, after each of the touch booster 48, the touch PCB 47, and the main PCB 46 is mounted to the inside of the side wall frame 411 of the handle support 41, the touch booster 48, the touch PCB 47, and the main PCB 46 may be prevented from shaking forward and downward, and side to side.

The holding rib 488 may be formed at each of the opposite ends (front and rear ends in FIG. 17) of the touch booster 48 by protruding forward and rearward (in FIG. 17), respectively, therefrom. The holding rib 488 is a part inserted into the holding-rib groove 418 of the handle support 41.

Accordingly, the holding rib 488 may be formed at the opposite ends of the touch booster 48 by protruding laterally therefrom and may be inserted into the holding-rib groove 418 of the handle support 41, whereby even without using a separate fastening means such as a screw, the touch booster 48 may be seated and supported at a precise position of the handle support 41. That is, the holding rib 488 of the touch booster 48 may be supported by the handle support and may be in contact with the inner surface of the handle cover 42, so the touch booster 48 may be prevented from shaking vertically and laterally such as forward and rearward and side to side.

Accordingly, when the handle cover 42 is mounted to the handle support 41, the touch booster 48 may be in close contact with the lower surface of the top piece 43 of the handle cover 42, so the vertical movement of the touch booster 48 may be prevented.

Additionally, as described above, the through hole 433 may be formed vertically through the top piece 43 of the handle cover 42 such that the through hole has a shape corresponding to the appearance of the top dome 491c, wherein the top dome 491c may be received in the through hole 433 and may guide light emission performed by the light emitting element 477 to the outside of the handle 40. Accordingly, a user may check whether contents contained inside the body 10 are being heated or kept warm from the upper side of the handle 40.

Meanwhile, although not shown in detail, a communication part may be provided in the inner space of the handle 40. That is, due to the provision of the communication part in the inner space of the handle 40, the electric kettle 1 may be configured to be controlled or to transmit information by wireless communication.

Such a communication part may be configured as various communication modules capable of communication, such as Wi-Fi, ZigBee, and NFC. In addition, the communication part may also be connected to the main PCB 46 such that the overall operation of the electric kettle 1 can be controlled by using wireless communication.

Figure 23:
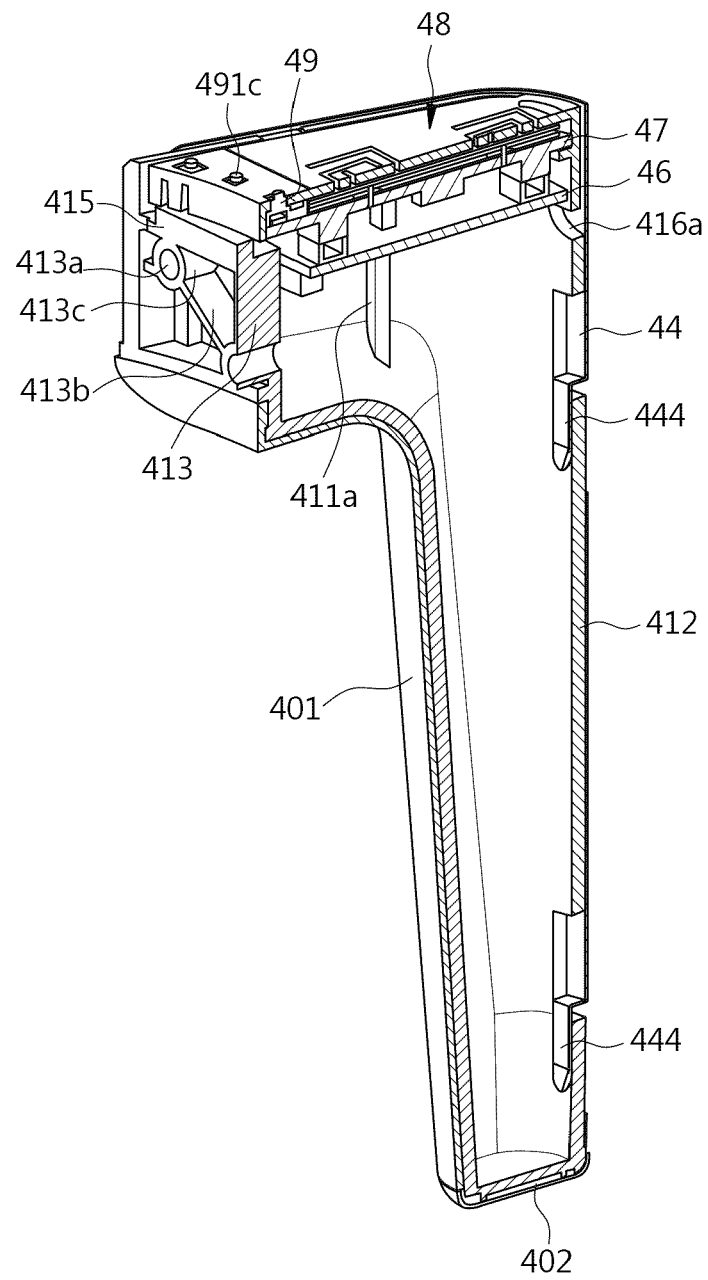
FIG. 23 is a cut perspective view illustrating a state in which the handle cover is removed from the handle of FIG. 21.
Figure 24:
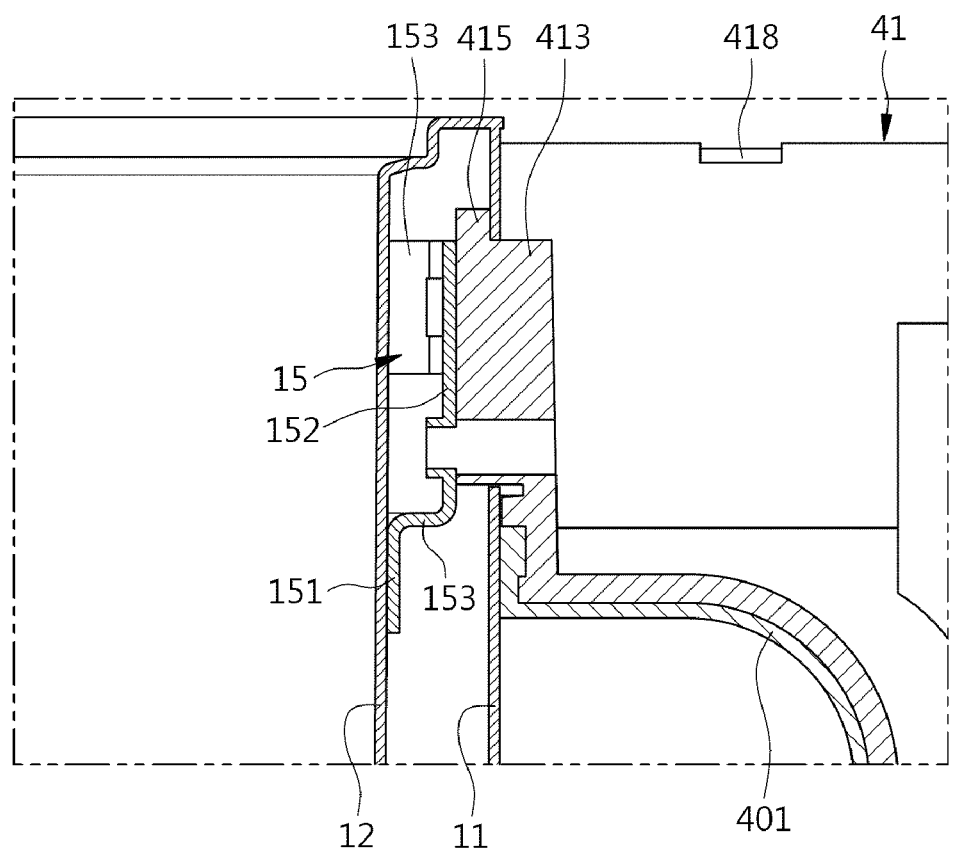
FIG. 24 is a partial sectional view illustrating a state in which the handle of FIG. 21 is fastened to the body.
Figure 25:
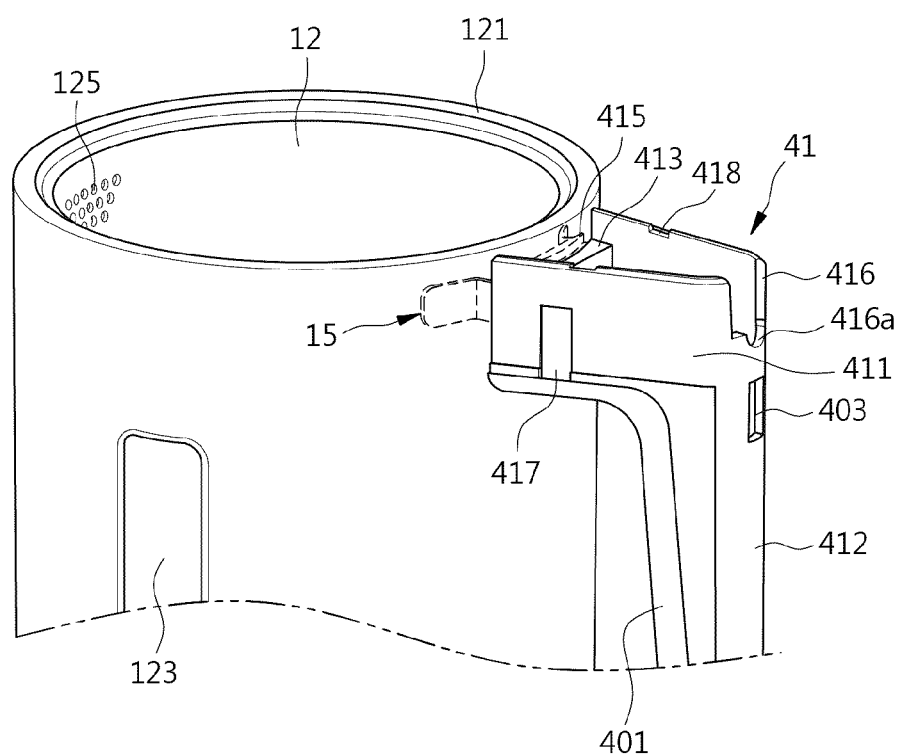
FIG. 25 is a partial perspective view illustrating a state in which the handle of FIG. 21 is fastened to an inner body.
Figure 26:
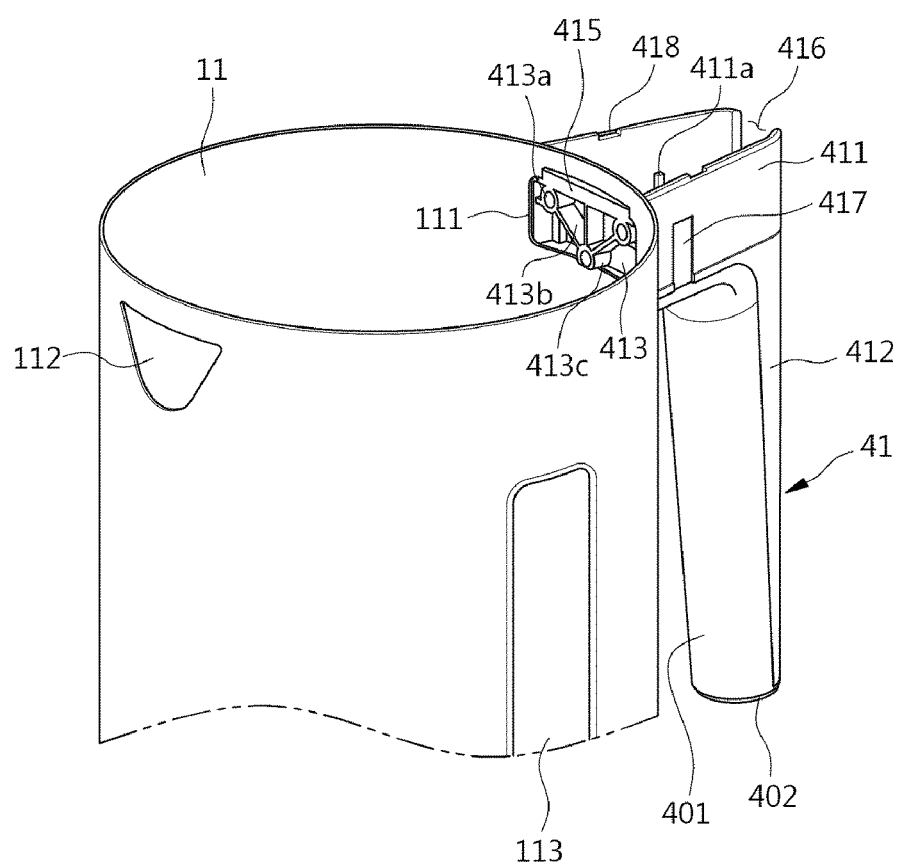
FIG. 26 is a partial perspective view illustrating a state in which the handle of FIG. 21 is coupled to an outer body.
Figure 27:
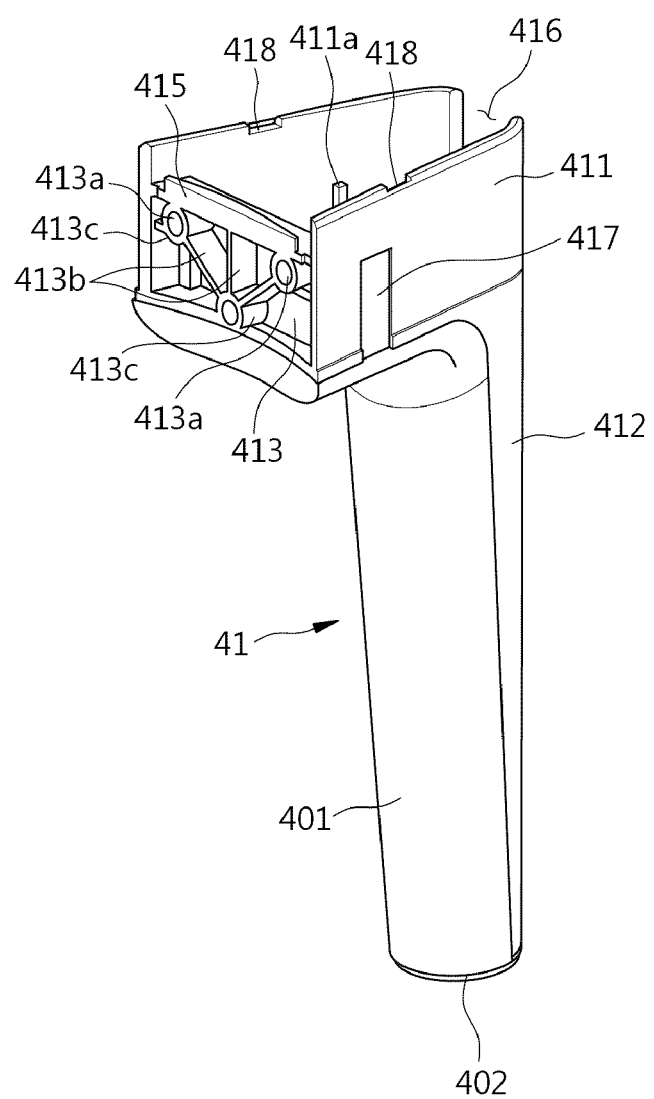
FIG. 27 is a perspective view illustrating the configuration of the handle support constituting the handle of FIG. 21.
Figure 28:
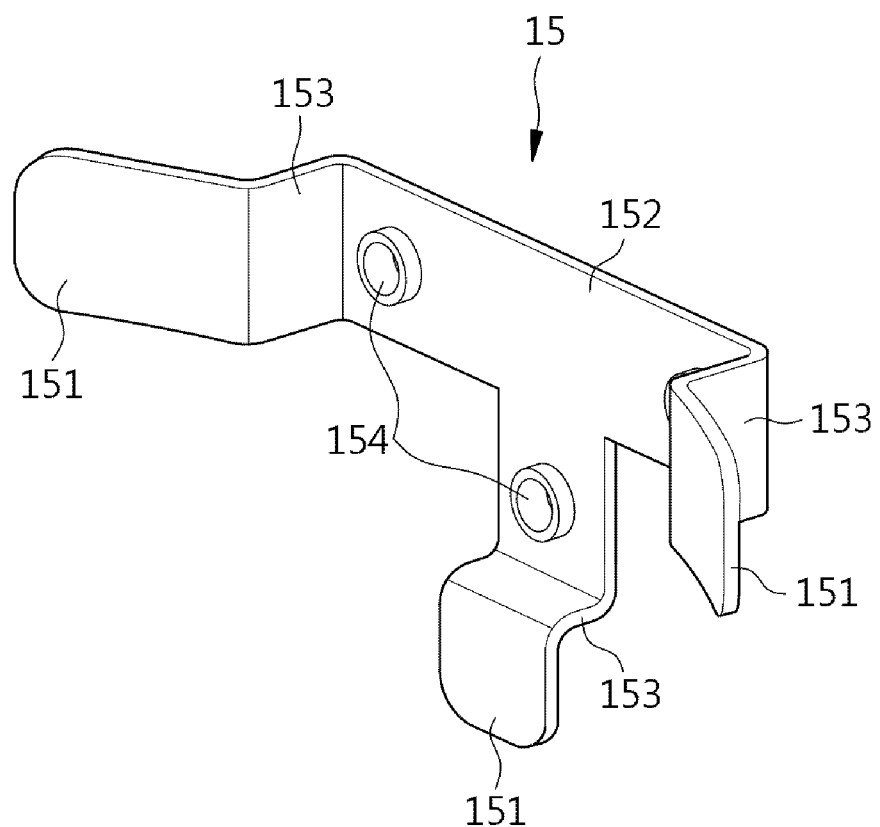
FIG. 28 is a perspective view illustrating the configuration of a handle bracket constituting the electric kettle of the present disclosure according to the second embodiment.

In FIGS. 21 to 28, the configuration of the handle 40 according to a second embodiment is illustrated. That is, a perspective view and an exploded perspective view of the handle 40 according to the second embodiment are illustrated in FIGS. 21 and 22, respectively; a cut perspective view of a state in which the handle cover 42 is removed from the handle 40 according to the second embodiment is illustrated in FIG. 23; a partial sectional view illustrating a state of the handle 40 the fastened to body 10 according to the second embodiment is illustrated in FIG. 24. In addition, partial perspective views illustrating states of the handle 40 hastened to the inner body 12 and the outer body 11 according to the second embodiment is illustrated in FIGS. 25 and 26, respectively; perspective views of the configurations of the handle support 41 and the handle bracket 15 according to the second embodiment are illustrated in FIG. 27 and FIG. 28, respectively.

Hereinafter, components having the same functions as components of the handle 40 described above use the same reference numerals, and description of the same components as described above will be omitted.

As illustrated in FIG. 21, the handle 40 according to the second embodiment and the handle 40 according to the first embodiment are different from each other in only a portion of the configurations of the handle support 41 and the handle bracket 15 constituting the handle 40 but are the same in the remaining configuration of the handle 40.

In the embodiment, the bracket fastening end 413 may be formed at the front end part of the handle support 41 such that the bracket fastening end has a shape of a flat plate having a predetermined size. Such a bracket fastening end 413 may have a U shape (when viewed from the right side) as a whole and may include three screw ends 413c formed in cylindrical shapes.

Accordingly, the bracket fastening end 413 may be fastened to the handle bracket 15 by three screws.

Meanwhile, at least one reinforcing rib 413b may be formed at the front surface of the bracket fastening end 413. The reinforcing rib 413b allows the screw ends 413c to be connected with each other or may be configured to connect a centered screw end 413c of the screw ends 413 with the holding end 415.

The holding end 415 may be formed on the upper end of the bracket fastening end 413 by protruding upward therefrom. That is, as illustrated in FIG. 22, the holding end 415 may be formed on the front end of the upper surface of the bracket fastening end 413 by protruding upward therefrom such that the holding end has a predetermined height.

The holding end 415 may be a part held in the upper end of the handle hole 111 of the outer body 11.

At least one seating rib 411a supporting the PCB may be formed at an inner side of the side wall frame 411. That is, as illustrated in FIG. 23, a pair of seating ribs 411a may be formed at the opposite sides, respectively, of the lower half portion of the inner surface of the side wall frame 411 by protruding inward therefrom.

The upper ends of the seating rib 411a may be formed to be in contact with the opposite ends of the lower surface of the main PCB 46 and may support the lower part of the main PCB 46.

In addition, a work hole 416a may be formed at the lower side of the support end groove 416 of the handle support 41 by being recessed downward therefrom. The work hole 416a may be a hole into which a worker inserts a driver from the rear side of the handle support 41 (the right side in FIG. 25) such that a screw can be fastened to the screw end 413c.

Meanwhile, the configuration of the handle bracket 15 according to the second embodiment of the present disclosure is illustrated in FIG. 28. The function and shape of each part of the handle bracket 15 are the same as described above, except that the handle bracket 15 is configured to be assembled by using three screws as illustrated in FIG. 28.

Specifically, the handle bracket 15 may include attaching parts 151 coupled to the inner body 12; a fastening part 152 coupled to the bracket fastening end 413; and a connecting part 153 connecting each of the attaching parts 151 and the fastening part 152 to each other, which are spaced apart from each other.

In addition, the attaching part 151 may be configured to have a curvature corresponding to the outer surface of the inner body 12 and may be fixed to the inner body 12 by welding or an adhesive.

However, here, three fastening holes 154 to which the screws are fastened may be formed at the handle bracket 15, and the attaching part 151 may be further formed even at a lower side of the handle bracket 15 in addition to the opposites of the handle bracket 15, which is different from the configuration of the above handle bracket 15, but the remaining function of the handle bracket 15 according to the second embodiment is the same as the function of the handle bracket according to the first embodiment.

Hereinafter, the operation of the electric kettle having the above configuration of the present disclosure will be described with reference to the accompanying drawings.

First, to use the electric kettle 1 of the present disclosure, a user may plug a power line (not shown) connected to the base 60 into an outlet such that power is supplied to the electric kettle.

In this state, after water or contents may be put into the heating space 101 of the inside of the body 10, the body 10 may be placed on the base 60.

When the body 10 is seated on the base 60, the upper power module 55 and the lower power module 64 may be in contact with each other such that power can be supplied to the body 10 from the base 60.

Next, a user may manipulate a press part of the top piece 43 of the handle 40 such that the heater 54 begins to be heated. In this case, a user may check a preset temperature through a display part such as the through hole 433 and may manipulate the first manipulation part 431 or the second manipulation part 432 such that water received in the heating space 101 begins to be heated. That is, the first manipulation part 431 which is an on/off button may be pressed to control the operation of the heater 54, so a user may control the heating of water and the stopping of the heating.

In addition, the second manipulation part 432 may be manipulated by being pressed such that the setting and manipulation of temperature can be instructed. In addition, as required, at least two manipulation parts (press parts) may be provided.

Due to such manipulation, the heater 54 may begin operating, and water received in the heating space 101 may be heated by heat generated by the heater 54.

When the water in the heating space 101 reaches a preset temperature detected by the temperature sensor 53, the operation of the heater 54 may stop and the operation of the electric kettle 1 may be completed.

When the operation of the electric kettle 1 is completed, a user may raise the body 10 by hold the handle 40 to separate the body 10 from the base 60 and may pour the heated water through the spout 30 by tilting the electric kettle 1.

In the electric kettle 1, in a state in which the heating of water is completed, heat transmission may be decreased or stopped due to the double structure of the body 10. Accordingly, even if a user touches the outer surface of the body 10 when using the electric kettle, the user may be safe since the outer surface is not excessively hot.

Even when the heater 54 stops operating, the temperature of the heated water may be maintained for a long time.

Meanwhile, the handle 40 may be coupled to the body 10. The assembly process of the handle 40 will be described hereinafter.

First, the parts of the control means 45 may be completely mounted to the handle support 41. Next, the handle cover 42 may be coupled to the handle support 41.

In this case, the cover bracket 44 may be fixed to the inner surface of the handle cover 42 by welding. In this state, the handle cover 42 may be brought close to the handle support 41 from the rear side of the handle support 41.

Specifically, with the handle cover 42 located at a slightly higher position than the handle support 41, the handle cover 42 may be brought into close contact with the rear surface of the handle support 41.

In this case, the rear surface of the handle cover 42 may be in close contact with the rear surface of the handle support 41, and in this state, the handle cover 42 may be moved downward.

When the handle cover 42 moves downward, the pillar part 442 of the cover bracket 44 may be in close contact with the rear surface of the pillar frame 412 of the handle support 41. Accordingly, the guide part 444c of the pillar hook 444 may be inserted into the pillar hook hole 403. Simultaneously, the side wall hook 443 may be received in the side wall hook groove 417.

In this case, the handle cover 42 may be in close contact with and fastened to the handle support 41. Accordingly, the assembly of the handle 40 may be completed.

After the assembly of the handle 40 is completed, the handle 40 may be fastened to the body 10.

Figure 3:
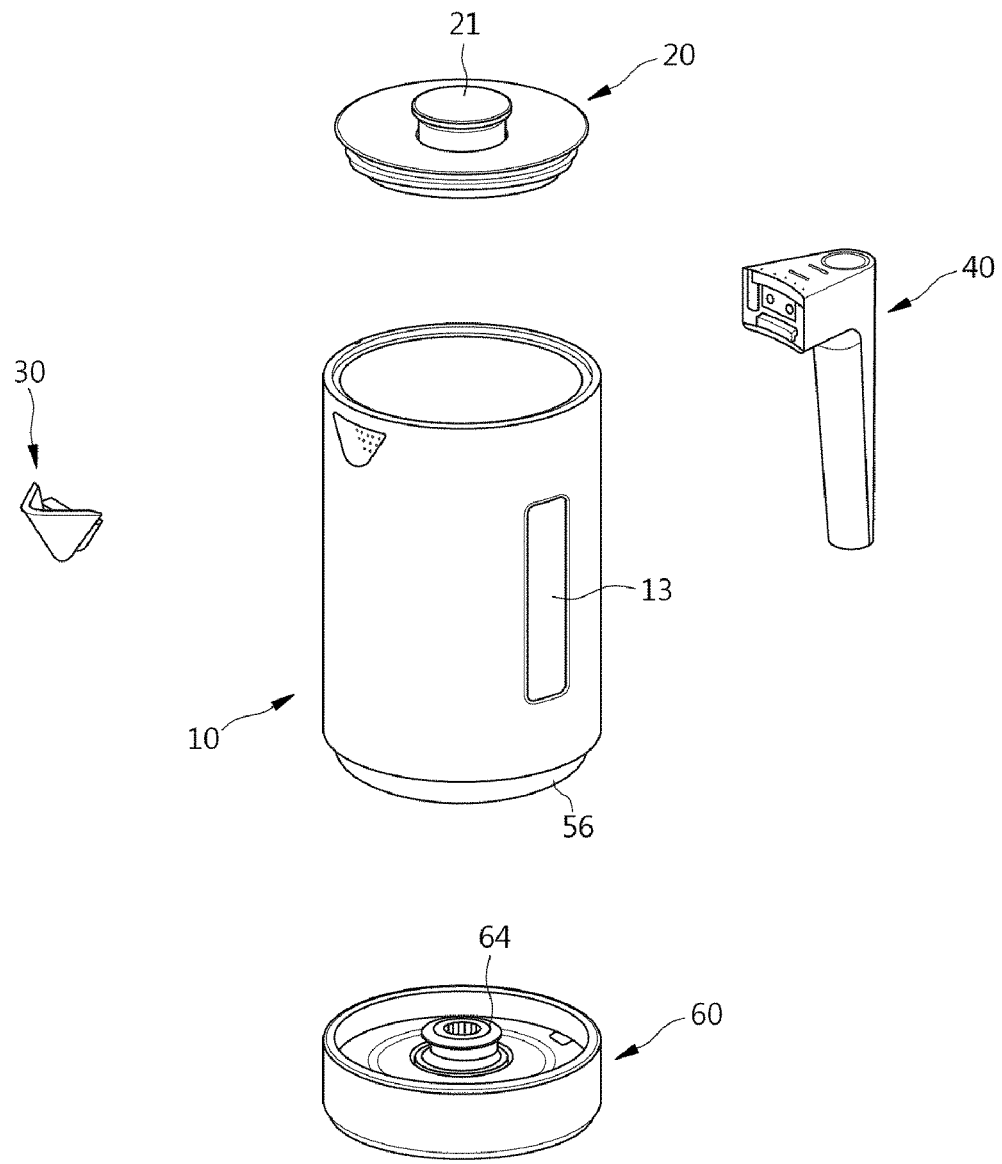
FIG. 3 is an upper side exploded perspective view illustrating the configuration of the electric kettle of the present disclosure.
Figure 4:
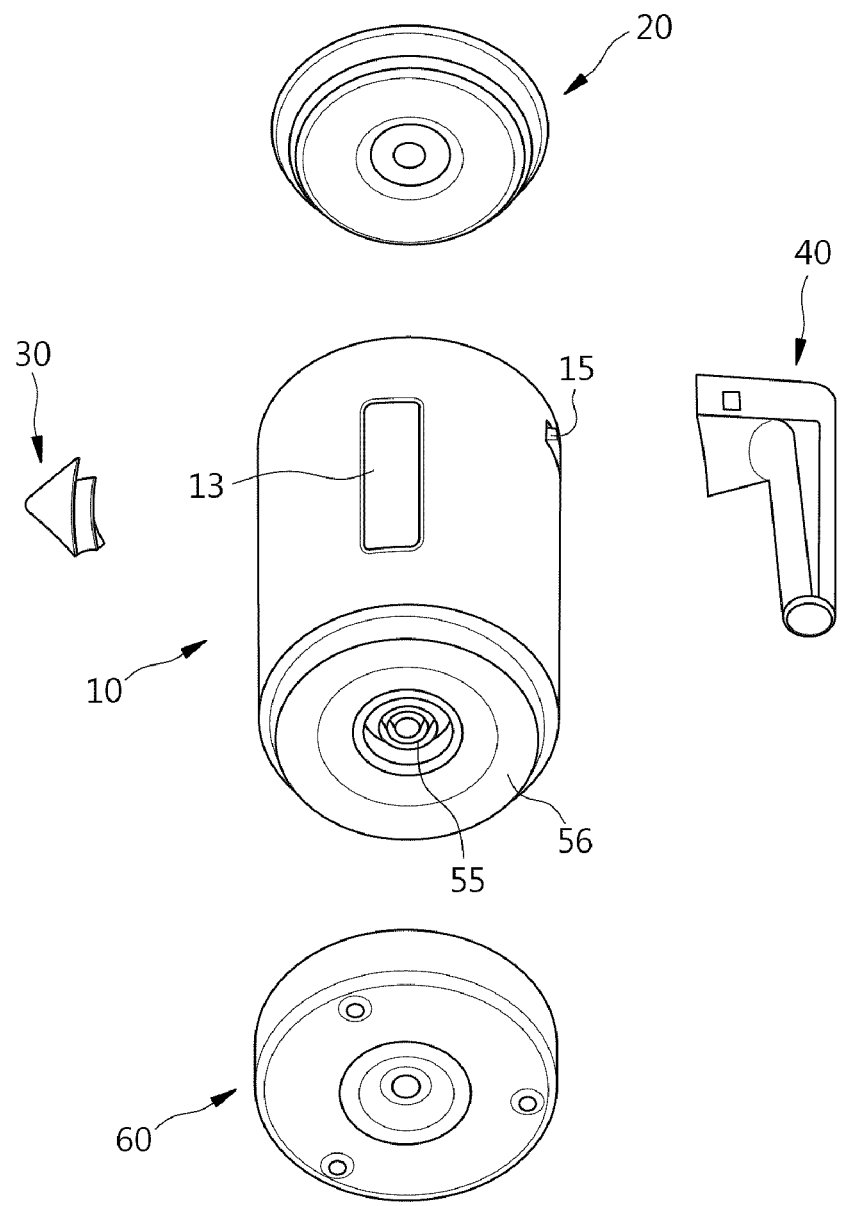
FIG. 4 is a lower side exploded perspective view illustrating the configuration of the electric kettle of the present disclosure.

Accordingly, in the state in which the handle 40 is assembled, the front end of the handle 40 may be brought close to the front end of the body 10. Of course, in this case, the handle bracket 15 may be coupled to the upper end of the inner body 12 as illustrated in FIGS. 3 to 5.

In this case, when the handle 40 is brought close to the body 10 by slightly slanting toward the body 10, the holding end 415 of the handle 40 may be received in the handle hole 111 of the outer body 11. Accordingly, when the holding end 415 is received in the outer body 11, the handle 40 may take a standing posture.

In this case, the bracket fastening end 413 of the handle 40 may be in close contact with the handle bracket 15, and the bracket fastening end 413 and the handle bracket 15 may be fastened to each other by screws.

When this process is completed, the handle 40 may be coupled to the body 10.

In addition, in the above embodiment, the bracket fastening end 413 and the handle bracket 15 are illustrated to be fastened to each other by two screws and three screws.

Additionally, according to the configuration of the holding end 415, the handle 40 may be moved downward or upward while being in close contact with the body 10 such that the bracket fastening end 413 and the handle bracket 15 may be fastened to each other. That is, in the first embodiment, the holding end 415 protrudes toward the lower side of the bracket fastening end 413. In this case, after the handle 40 is brought into close contact with the body 10, the handle 40 may be moved downward to be fastened to the body 10.

Contrarily, in the handle 40 according to the second embodiment, the holding end 415 may protrude to the upper side of the bracket fastening end 413. In this case, after the handle 40 is brought into close contact with the body 10, the handle may be moved up to be fastened to the body 10.

Accordingly, a state in which the holding end 415 protruding upward is coupled to the outer body 11 is illustrated in FIG. 26.

Of course, without first assembling the handle 40, the handle support 41 of the handle 40 may first be coupled to the body 10, and then the handle cover 42 may be coupled to the handle support 41 as described above. That is, as illustrated in FIGS. 25 and 26, the handle support 41 may first pass through the outer body 11 such that the holding end 415 is held in the handle hole 111, and then the bracket fastening end 413 may be fastened to the handle bracket 15 by a screw.

Next, the handle cover 42 may be coupled to the handle support 41 by being brought into close contact therewith. Of course, in this case, prior to the coupling of the handle cover 42, the control means 45 may first be required to be installed.

The scope of the present disclosure is not limited to the embodiments illustrated above, and those skilled in the art may make many other modifications based on the present disclosure within the technical scope of the present disclosure as described above.

The invention claimed is:

1. An electric kettle comprising:
    a body receiving water or food therein;
    a lid configured to shield an open upper side of the body;
    a base provided at a lower side of the body and configured to support the body;
    a spout provided on an upper end of the body and guiding a discharge of the water or food contained inside the body; and
    a handle fastened to the upper end of the body and configured to be held by hand, and
    wherein the body is configured to have a double structure such that the body comprises an inner body constituting an appearance of the inside of the body and an outer body constituting an appearance of an outside of the body,
    wherein the handle is coupled to an upper end of the inner body, and
    wherein a handle bracket is provided at the inner body, and the handle is fastened to the handle bracket,
    wherein the handle bracket is fixed to an outer surface of the inner body by welding or an adhesive.

2. The electric kettle of claim 1, wherein the handle comprises:
- a handle support supporting multiple parts provided therein and constituting a frame of the handle, and
- a handle cover coupled to the handle support and covering the multiple parts provided in the handle support,
- wherein the handle cover is fastened to the handle support.

3. The electric kettle of claim 2, wherein a cover bracket provided with at least one hook and coupled integrally to the handle cover is provided at an inner surface of the handle cover, the cover bracket being in close contact with and fixed to the inner surface of the handle cover by welding or an adhesive.

4. The electric kettle of claim 3, wherein the handle support comprises:
- a side wall frame covering the parts received therein, and
- a pillar frame formed by bending downward and extending from an end of the side wall frame,
- wherein the cover bracket comprises: a side part configured to have a shape corresponding to a shape of an outer surface of the side wall frame, and a pillar part configured to have a shape corresponding to a shape of an outer surface of the pillar frame.

5. The electric kettle of claim 4, wherein a bracket fastening end to which the handle bracket is fastened is provided in the handle support, and
- at least one reinforcing rib is formed at a side of the bracket fastening end so as to reinforce rigidity of the bracket fastening end.

6. The electric kettle of claim 5, wherein the handle bracket comprises:
- an attaching part coupled to the inner body;
- a fastening part coupled to the bracket fastening end; and
- a connecting part connecting the attaching part and the fastening part to each other, the attaching part and the fastening part being spaced apart from each other.

7. The electric kettle of claim 6, wherein a holding end held in the outer body is formed at an end of the handle support by protruding outward therefrom.

* * * * *